United States Patent
Koga

(10) Patent No.: US 9,990,752 B2
(45) Date of Patent: Jun. 5, 2018

(54) IMAGE PROCESSING DEVICE, IMAGING DEVICE, MICROSCOPE SYSTEM, IMAGE PROCESSING METHOD, AND COMPUTER-READABLE RECORDING MEDIUM

(71) Applicant: OLYMPUS CORPORATION, Hachioji-shi, Tokyo (JP)

(72) Inventor: Shunichi Koga, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 36 days.

(21) Appl. No.: 15/343,692

(22) Filed: Nov. 4, 2016

(65) Prior Publication Data
US 2017/0076481 A1 Mar. 16, 2017

Related U.S. Application Data

(63) Continuation of application No. PCT/JP2014/081787, filed on Dec. 1, 2014.

(30) Foreign Application Priority Data

Jun. 10, 2014 (JP) ................. 2014-119868

(51) Int. Cl.
| | | |
|---|---|---|
| *G06T 11/60* | (2006.01) | |
| *G06T 5/50* | (2006.01) | |
| *G02B 21/24* | (2006.01) | |
| *G02B 21/26* | (2006.01) | |

(Continued)

(52) U.S. Cl.
CPC .......... *G06T 11/60* (2013.01); *G02B 21/0032* (2013.01); *G02B 21/082* (2013.01);
(Continued)

(58) Field of Classification Search
CPC .......... G06T 11/60; G06T 5/001; G06T 5/50; G02B 21/0032; G02B 21/082;
(Continued)

(56) References Cited

U.S. PATENT DOCUMENTS

2001/0033701 A1   10/2001   Okisu et al.
2010/0157078 A1*  6/2010   Atanassov .............. G06T 5/007
                                                              348/222.1
(Continued)

FOREIGN PATENT DOCUMENTS

JP       11055558 A      2/1999
JP    2005039339 A      2/2005
(Continued)

OTHER PUBLICATIONS

International Search Report (ISR) and Written Opinion dated Mar. 3, 2015 issued in International Application No. PCT/JP2014/081787.

*Primary Examiner* — David F Dunphy
(74) *Attorney, Agent, or Firm* — Holtz, Holtz & Volek PC

(57) ABSTRACT

An image processing device includes: an image acquiring unit that acquires first and second image groups, each image sharing a common part of a subject with the other image in different first and second directions; a calculating unit that calculates, as a shading component, a ratio of luminance of an area in one or more images, the area sharing a common subject with another area including a flat area whose shading component is constant in a single image other than the one or more images, to luminance of the another area, for each of the first and second image groups; and a correcting unit that performs a shading correction on shading areas in the images using the shading component. The shading component includes a normalized shading component based on luminance of the flat area, and a non-normalized shading component based on luminance of an area other than the flat area.

17 Claims, 20 Drawing Sheets

(51) Int. Cl.
*G02B 21/08* (2006.01)
*G02B 21/02* (2006.01)
*G02B 21/36* (2006.01)
*G06T 5/00* (2006.01)
*G02B 21/00* (2006.01)
*G02B 21/34* (2006.01)
*G02B 5/00* (2006.01)
*H04N 5/357* (2011.01)

(52) U.S. Cl.
CPC .......... *G02B 21/248* (2013.01); *G02B 21/26* (2013.01); *G02B 21/36* (2013.01); *G02B 21/362* (2013.01); *G02B 21/367* (2013.01); *G06T 5/001* (2013.01); *G06T 5/50* (2013.01); *G02B 5/005* (2013.01); *G02B 21/025* (2013.01); *G02B 21/34* (2013.01); *G06T 2207/10056* (2013.01); *G06T 2207/20221* (2013.01); *H04N 5/3572* (2013.01)

(58) Field of Classification Search
CPC ...... G02B 21/248; G02B 21/26; G02B 21/36; G02B 21/362; G02B 21/367
See application file for complete search history.

(56) References Cited

U.S. PATENT DOCUMENTS

| | | | |
|---|---|---|---|
| 2013/0329033 A1 | 12/2013 | Shibata et al. | |
| 2014/0204187 A1* | 7/2014 | Sasaki | A61B 1/00009 348/65 |
| 2015/0213586 A1* | 7/2015 | Koike | G06T 5/007 382/284 |
| 2015/0310613 A1* | 10/2015 | Murakami | G02B 21/365 382/128 |
| 2015/0356904 A1* | 12/2015 | Nakatani | G09G 5/377 345/690 |
| 2016/0292835 A1* | 10/2016 | Shibata | H04N 1/3871 |
| 2017/0076480 A1* | 3/2017 | Matsuoka | G06T 5/008 |
| 2017/0132765 A1* | 5/2017 | Sato | G06T 5/008 |

FOREIGN PATENT DOCUMENTS

| | | | | |
|---|---|---|---|---|
| JP | 2006171213 A | | 6/2006 | |
| JP | 2008051773 A | | 3/2008 | |
| JP | 2013257422 A | | 12/2013 | |
| WO | WO 2013/047215 | * | 3/2013 | ............... G06T 3/00 |

* cited by examiner

I(x,y)

T(x,y)

S(x,y)

IMAGE PROCESSING DEVICE, IMAGING DEVICE, MICROSCOPE SYSTEM, IMAGE PROCESSING METHOD, AND COMPUTER-READABLE RECORDING MEDIUM

CROSS REFERENCES TO RELATED APPLICATIONS

This application is a continuation of PCT international application Ser. No. PCT/JP2014/081787, filed on Dec. 1, 2014 which designates the United States, incorporated herein by reference, and which claims the benefit of priority from Japanese Patent Application No. 2014-119868, filed on Jun. 10, 2014, incorporated herein by reference.

BACKGROUND

1. Technical Field

The disclosure relates to an image processing device, an imaging device, a microscope system, an image processing method, and a computer-readable recording medium for performing image processing on an image acquired by imaging a specimen or the like.

2. Related Art

In recent years, a so-called virtual slide technology has been known that records an image acquired by imaging a specimen placed on a slide glass as electronic data and allows a user to observe the image on a monitor of a personal computer or the like. According to the virtual slide technology, by sequentially stitching partial images of a specimen enlarged by a microscope, a high-resolution image on which the whole specimen is shown is built. In other words, the virtual slide technology is a technology for generating an image of which the visual field for a subject is enlarged by acquiring a plurality of images of the same subject having different visual fields and stitching the images.

A microscope includes a light source for illuminating a specimen and an optical system for enlarging an image of the specimen. In a later stage of the optical system, an image sensor for converting an image of an enlarged specimen into electronic data is provided. For this reason, brightness unevenness may occur in an acquired image due to illumination unevenness of a light source, non-uniformity of an optical system, irregular characteristics of an image sensor, and the like. This brightness unevenness is called shading, and, generally, a part of an image is darker as the part is located farther from the center of the image corresponding to the position of an optical axis of the optical system. For this reason, in a case where a virtual slide image is generated by stitching a plurality of images, an unnatural boundary is generated in a portion stitching the images. Since the shading is repeated by stitching the plurality of images, the virtual slide image is seen as if a periodical pattern is present in the specimen.

In order to address such a situation, a shading correction technology has been known that acquires a shading pattern as a calibration image in advance and corrects an image in which a specimen is shown based on the calibration image. For example, JP 2006-171213 A discloses a shading correction technique in which imaging is performed when a specimen is retracted outside of the angle of view of the optical system at the time of a transmitting illumination observation, and an image acquired by performing imaging when a reflection member is arranged within the angle of view of the optical system, is used as a calibration image at the time of epi-illumination observation.

JP 2008-51773 A discloses a method of acquiring data used for a shading correction by performing imaging using a uniform fluorescent sample as a calibration sample at the time of a fluorescence observation.

JP 2013-257422 A discloses a technique in which a reference visual field image that is an image in a predetermined visual field range of a sample is captured, the position of the sample is relatively moved with respect to an optical system, a plurality of peripheral visual field images that include a predetermined area within the predetermined visual field range and are images of a peripheral visual field range different from the predetermined visual field range are captured, and a correction gain of each pixel of the reference visual field image is calculated based on the reference visual field image and the peripheral visual field images.

SUMMARY

In some embodiments, an image processing device includes: an image acquiring unit configured to acquire first and second image groups including a plurality of images each sharing a common part of a subject with at least one of the other images in each of different first and second directions; a shading component calculating unit configured to calculate, as a shading component, a ratio of luminance of an area in one or more images, the area sharing a common subject with another area including a flat area whose shading component is constant in a single image other than the one or more images, to luminance of the another area, for each of the first and second image groups; and an image correcting unit configured to perform a shading correction on shading areas in the images by using the shading component. The shading component includes a normalized shading component using, as a reference, luminance of the flat area in a common area where the single image and the one of the other images share the common subject, and a non-normalized shading component using, as a reference, luminance of an area other than the flat area in the common area. The image correcting unit is configured to perform the shading correction based on the normalized shading component and the non-normalized shading component.

In some embodiments, an imaging device includes: the image processing device; an optical system configured to generate an image of the subject; a moving unit configured to move at least one of the subject and the optical system, thereby to move a visual field of the optical system with respect to the subject; and an imaging unit configured to image the subject. The image acquiring unit is configured to control the imaging unit to perform imaging while causing the moving unit to move the visual field in the first and second directions, thereby to acquire the first and second image groups.

In some embodiments, a microscope system includes: the imaging device and a stage on which the subject is configured to be placed. The moving unit is configured to move at least one of the stage and the optical system.

In some embodiments, an image processing method includes: acquiring first and second image groups including a plurality of images each sharing a common part of a subject with at least one of the other images in each of different first and second directions; calculating, as a shading component, a ratio of luminance of an area in one or more images, the area sharing a common subject with another area including a flat area whose shading component is constant in a single image other than the one or more images, to luminance of the another area, for each of the first and second image groups; and performing a shading correction on shading areas in the images by using the shading component. The shading component includes a normalized shading component using, as a reference, luminance of the flat area in a common area where the single image and the one of the other images share the common subject, and a non-normalized shading component using, as a reference, luminance of an area other than the flat area in the common area. The shading correction is performed based on the normalized shading component and the non-normalized shading component.

In some embodiments, provided is a non-transitory computer-readable recording medium with an executable image processing program stored thereon. The program causes a computer to execute: acquiring first and second image groups including a plurality of images each sharing a common part of a subject with at least one of the other images in each of different first and second directions; calculating, as a shading component, a ratio of luminance of an area in one or more images, the area sharing a common subject with another area including a flat area whose shading component is constant in a single image other than the one or more images, to luminance of the another area, for each of the first and second image groups; and performing a shading correction on shading areas in the images by using the shading component. The shading component includes a normalized shading component using, as a reference, luminance of the flat area in a common area where the single image and the one of the other images share the common subject, and a non-normalized shading component using, as a reference, luminance of an area other than the flat area in the common area. The shading correction is performed based on the normalized shading component and the non-normalized shading component.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, an image processing device, an imaging device, a microscope system, an image processing method, and an image processing program according to some embodiments of the present invention will be described in detail with reference to the drawings. The present invention is not limited to the embodiments. The same reference signs are used to designate the same elements throughout the drawings.

First Embodiment

Figure 1:
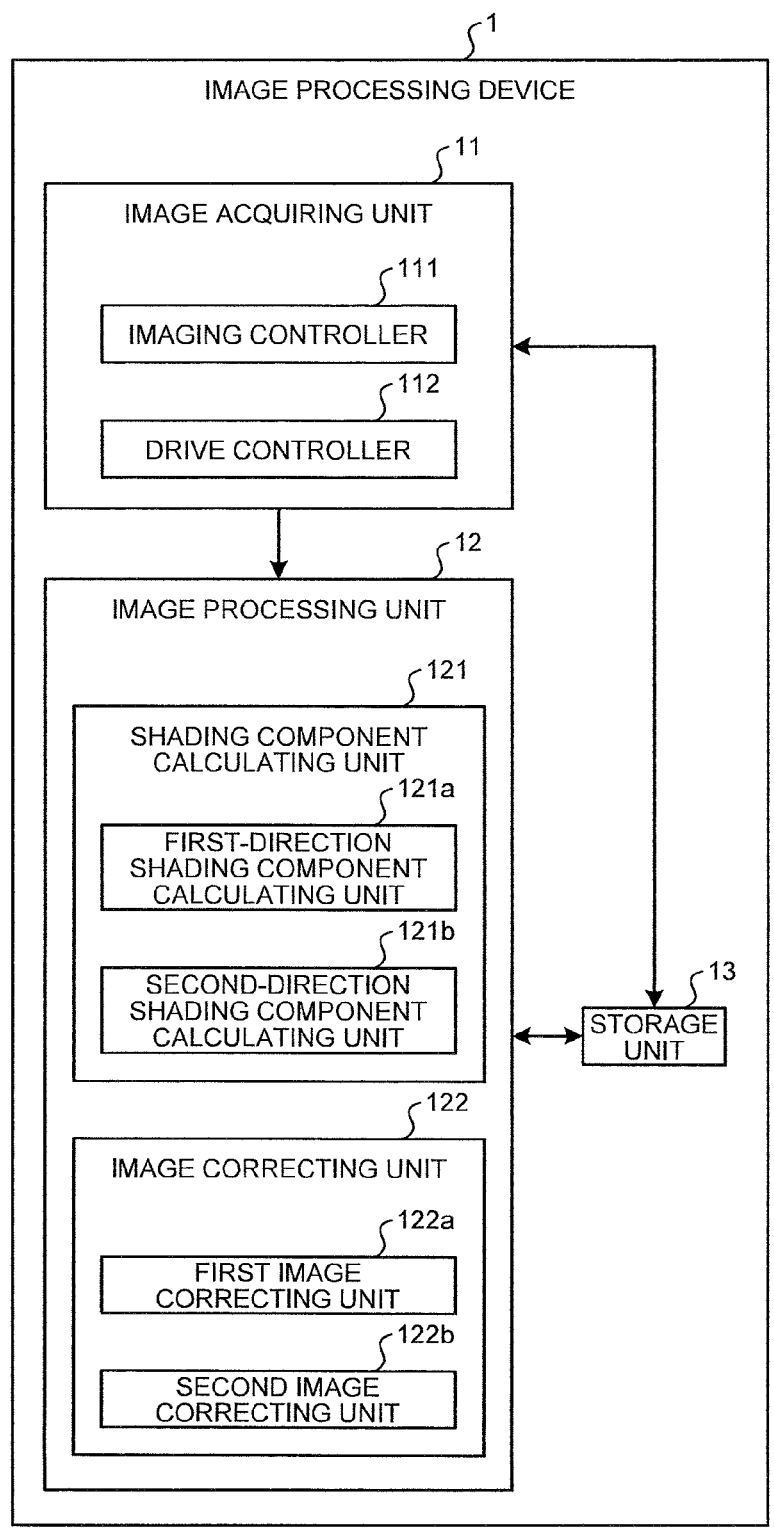
FIG. 1 is a block diagram that illustrates an example of the configuration of an image processing device according to a first embodiment of the present invention.

FIG. 1 is a block diagram that illustrates an example of the configuration of an image processing device according to a first embodiment of the present invention. As illustrated in FIG. 1, the image processing device 1 according to the first embodiment includes: an image acquiring unit 11 that acquires an image in which a subject as an observation target is shown; an image processing unit 12 that performs image processing for the image; and a storage unit 13.

The image acquiring unit 11 acquires a plurality of images having different imaging visual fields for a subject. The image acquiring unit 11 may directly acquire the plurality of images from the imaging device or acquire the images through a network, a storage device, or the like. In the first embodiment, the image acquiring unit 11 directly acquires images from the imaging device. Here, the kind of imaging device is not particularly limited but, for example, may be a microscope device having an imaging function or a digital camera.

Figure 2:
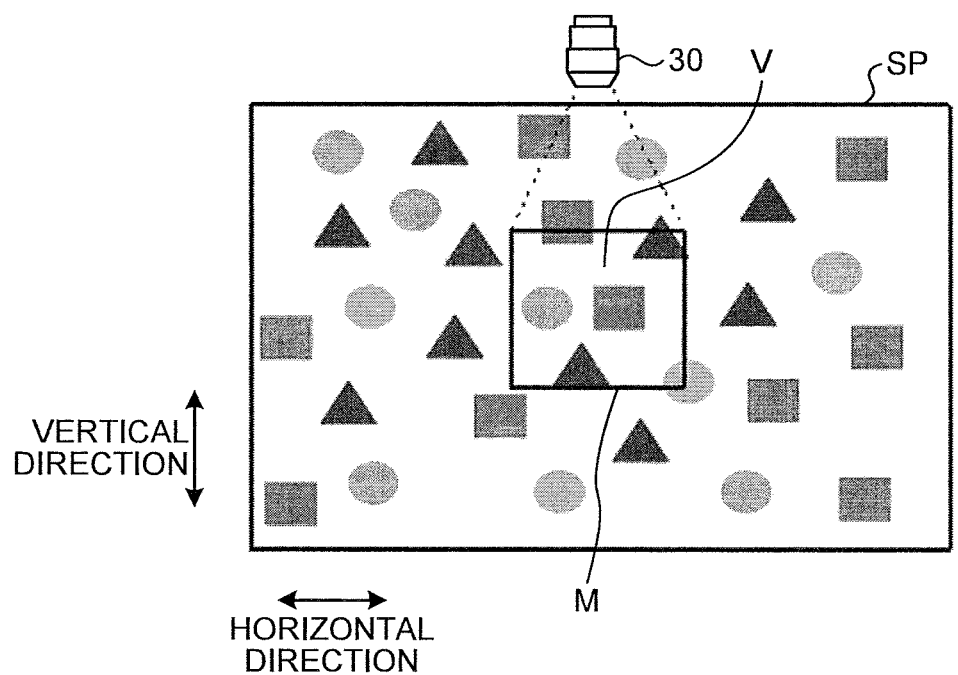
FIG. 2 is a schematic diagram that illustrates the operation of an image acquiring unit illustrated in FIG. 1.

FIG. 2 is a schematic diagram that illustrates the operation of the image acquiring unit 11 and illustrates an optical system 30 of the imaging device, a subject SP, and an imaging visual field V of the optical system 30. In FIG. 2, in order to clarify the position of the imaging visual field V for the subject SP, for the convenience of description, the position of the optical system 30 is shifted from the front of the sheet face of the subject SP and the imaging visual field V, and a positional relation between the optical system and the imaging visual field V is illustrated with the side face of the optical system 30 illustrated on the outer side of the subject SP. Hereinafter, on a plane including the imaging visual field V, a direction (a horizontal direction in FIG. 2) parallel to one side of the imaging visual field V will be referred to as a horizontal direction, and a direction (a vertical direction illustrated in FIG. 2) perpendicular to the one side will be referred to as a vertical direction.

The image acquiring unit 11 includes an imaging controller 111 that controls the imaging operation of the imaging device and a drive controller 112 that performs control of changing the position of the imaging visual field V with respect to the subject SP. The drive controller 112 changes the position of the imaging visual field V with respect to the subject SP by relatively moving one or both of the optical system 30 and the subject SP. The imaging controller 111 causes the imaging device to perform imaging at predetermined timing in linkage with a control operation of the drive controller 112 and takes in an image M in which the subject within the imaging visual field V is shown from the imaging device.

In the first embodiment, while an example is described in which the imaging visual field V is moved in two directions of the horizontal direction and the vertical direction that are orthogonal to each other, the moving directions of the imaging visual field V are not limited to the horizontal direction and the vertical direction, as long as the moving directions are two different directions. In addition, the two directions in which the imaging visual field V is moved do not necessarily need to be orthogonal to each other.

Figure 3A:
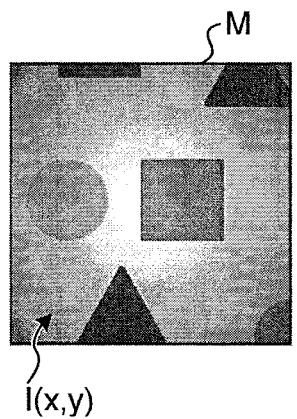
FIGS. 3A to 3C are schematic diagrams illustrating the principle of image processing performed by an image processing unit illustrated in FIG. 1.
Figure 3B:
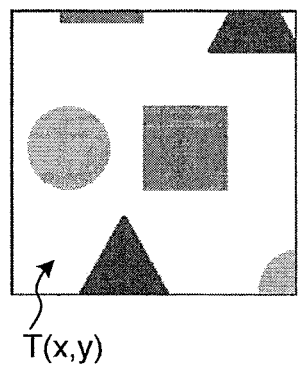
Figure 3C:
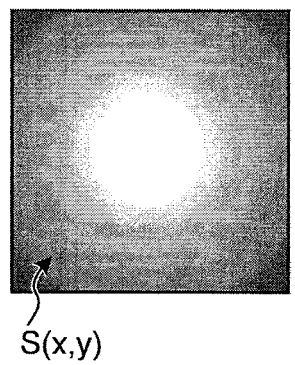

FIGS. 3A to 3C are schematic diagrams illustrating the principle of image processing performed by the image processing unit 12. Coordinates (x,y) illustrated in FIGS. 3A to 3C represent positions of pixels constituting the image M. As illustrated in FIG. 3A, in the image M acquired by the imaging device, except for a part of the area at the center, brightness unevenness or color unevenness due to illumination unevenness of the light source, non-uniformity of the optical system, irregular characteristics of the image sensor, or the like occurs. Such brightness unevenness or color unevenness is called shading. The luminance $I(x,y)$ of each pixel constituting the image M illustrated in FIG. 3A is acquired by multiplying a component (hereinafter, referred to as a texture component) $T(x,y)$ representing an original subject image in which the shading illustrated in FIG. 3B does not occur by a shading component $S(x,y)$ illustrated in FIG. 3C and can be represented as $I(x,y)=T(x,y)\times S(x,y)$. Here, while the luminance $I(x,y)$, the texture component $T(x,y)$, and the shading component $S(x,y)$ are respectively the luminance, the texture component, and the shading component of each color signal at each coordinates, the luminance, the texture component, and the shading component may be respectively luminance, a texture component, and a shading component of a signal combined based on color signals.

The image processing unit 12 performs image processing for correcting the shading generated in the image by using a plurality of images acquired by the image acquiring unit 11. In more details, the image processing unit 12 includes: a shading component calculating unit 121 that calculates a shading component generated in the image $M(x,y)$; and an image correcting unit 122 that performs a shading correction by using the shading component.

The shading component calculating unit 121 includes a first-direction shading component calculating unit 121a and a second-direction shading component calculating unit 121b. The first-direction shading component calculating unit 121a calculates a shading component based on a plurality of images acquired by moving the imaging visual field V in a first direction (for example, the horizontal direction) with respect to the subject SP. On the other hand, the second-direction shading component calculating unit 121b calculates a shading component based on a plurality of images acquired by moving the imaging visual field V in a second direction (for example, the vertical direction) with respect to the subject SP.

The image correcting unit 122 includes a first image correcting unit 122a and a second image correcting unit 122b. The first image correcting unit 122a performs a shading correction on a partial area in the image acquired by the image acquiring unit 11, by using one of the shading component calculated by the first-direction shading component calculating unit 121a and the shading component calculated by the second-direction shading component calculating unit 121b. The second image correcting unit 122b performs a shading correction on an area of the image that is not corrected by the first image correcting unit 122a, by using both of the shading component calculated by the first-direction shading component calculating unit 121a and the shading component calculated by the second-direction shading component calculating unit 121b. The areas that are correction targets for the first image correcting unit 122a and the second image correcting unit 122b and specific correction processes will be described later.

The storage unit 13 is configured by a storage device such as flash memory for which update recording can be performed, semiconductor memory called RAM or ROM, and the like. The storage unit 13 stores various parameters used by the image acquiring unit 11 for controlling the imaging device, image data of an image for which image processing is performed by the image processing unit 12, various parameters calculated by the image processing unit 12, and the like.

The image acquiring unit 11 and the image processing unit 12 may be configured by dedicated hardware or be configured by a CPU and a program causing the CPU to perform a predetermined process. In the latter case, an image processing program used for causing the image acquiring unit 11 and the image processing unit 12 to perform a predetermined process, various parameters and setting information used in the execution of such a program may be stored in the storage unit 13. Alternatively, it may be configured such that a storage device including a recording medium such as a hard disk, an MO, a CD-R, or a DVD-R and a writing/reading device that reads/writes information from/into the recording medium is connected to the image processing device 1 through a data communication terminal, and the image processing program and the parameters described above are stored in the storage device.

Figure 4:
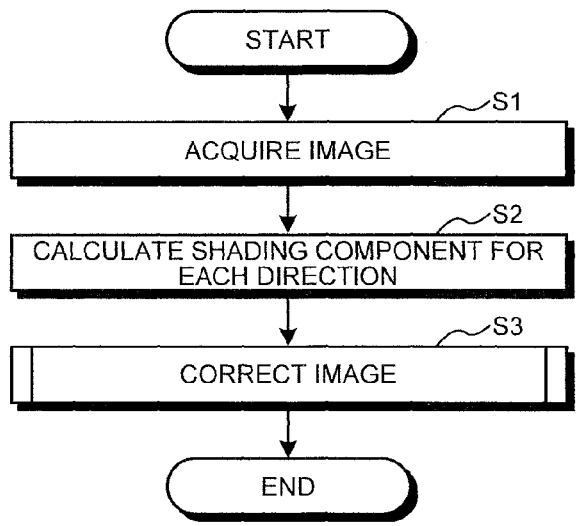
FIG. 4 is a flowchart that illustrates the operation of the image processing device illustrated in FIG. 1.

Next, the operation of the image processing device 1 will be described. FIG. 4 is a flowchart that illustrates the operation of the image processing device 1. Hereinafter, as an example, an image in which a subject SP illustrated in FIG. 2 is shown is assumed to be acquired, and a correction process is assumed to be performed for the image.

First, in Step S1, the image acquiring unit 11 acquires a plurality of images generated by imaging the subject SP while moving the imaging visual field V in two different directions by a predetermined amount each time. In more details, the drive controller 112 moves the imaging visual field V in a predetermined direction by moving one of the subject SP and the optical system 30, and the imaging controller 111 performs control such that a part of the imaging visual field V overlaps at least one different image in the moving direction of the imaging visual field V. Hereinafter, the imaging visual field V is assumed to be moved respectively in the horizontal direction and the vertical direction.

Figure 5:
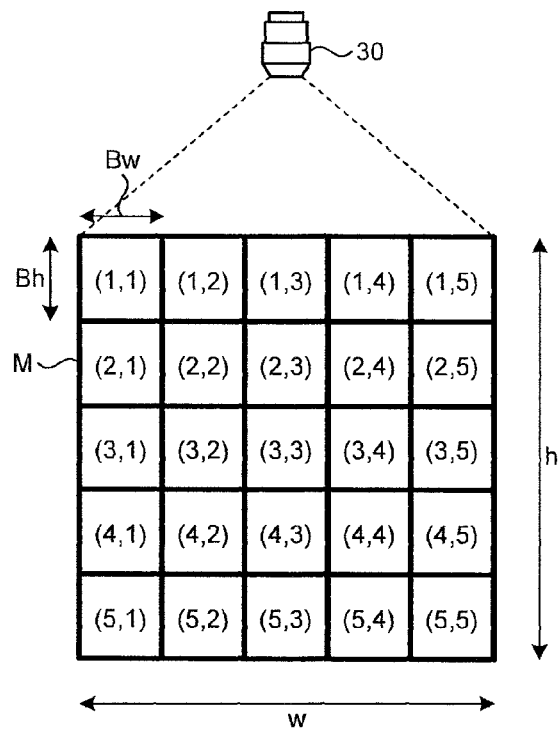
FIG. 5 is a schematic diagram that illustrates a moving amount for moving an imaging visual field for each time when imaging is performed once.

FIG. 5 is a schematic diagram that illustrates a moving amount for moving an imaging visual field V for each time when imaging is performed once. The moving amount of the imaging visual field V per performing imaging once is set as the length of one side of a block in a case where the imaging visual field V is divided into a plurality of blocks each having a predetermined size. For example, as illustrated in FIG. 5, in a case where an imaging visual field V having a size of w×h (here, w and h are lengths of sides) is divided into 5×5=25 blocks, the moving amount of the imaging visual field V per performing imaging once is a length Bw=w/5 in the horizontal direction and a length Bh=h/5 in the vertical direction. The size of each block acquired by dividing the imaging visual field V can be determined based on the size of a flat area (to be described later) in which shading is hardly generated inside an image, and a shading component is considered to be constant, the requested precision of a shading correction, and the like. Here, the numbers of divisions of the imaging visual field V in the horizontal direction and the vertical direction may be the same or different from each other. Hereinafter, as illustrated in FIG. 5, the coordinates of each block disposed in an image will be denoted by (X,Y). In the first embodiment, 1≤X≤5 and 1≤Y≤5.

Figure 6:
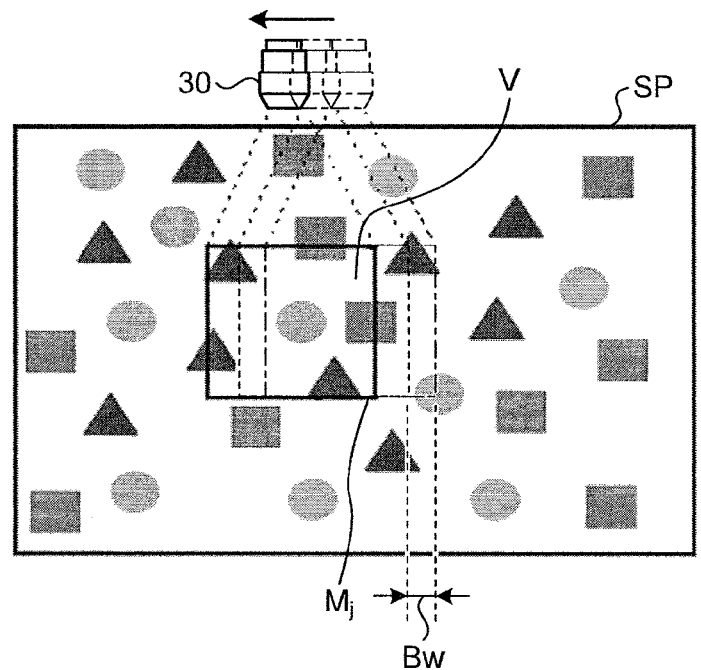
FIG. 6 is a schematic diagram that illustrates a method of imaging a subject.
Figure 7:
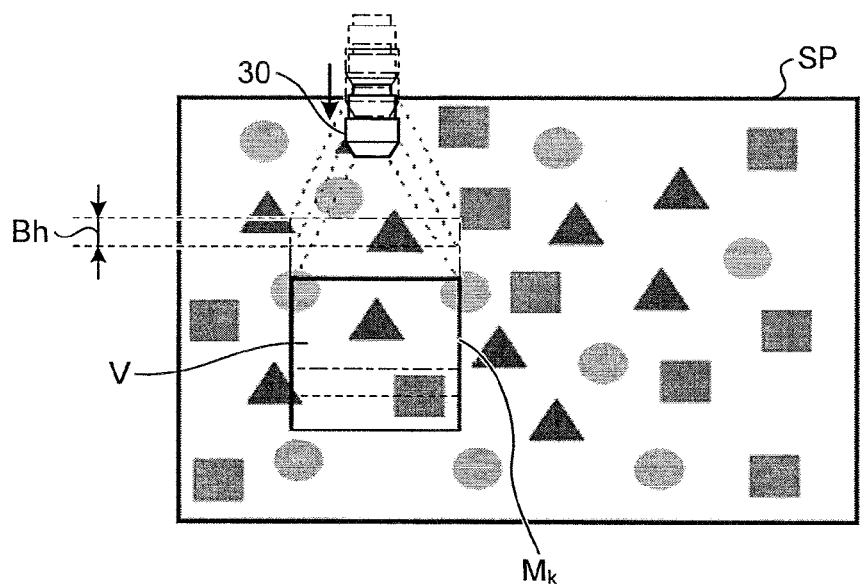
FIG. 7 is a schematic diagram that illustrates a method of imaging a subject.

FIGS. 6 and 7 are schematic diagrams that illustrate a method of imaging a subject SP. In FIGS. 6 and 7, in order to clarify the position of the imaging visual field V for the subject SP, for the convenience of description, the position of the optical system 30 is shifted from the front of a sheet face of the subject SP and the imaging visual field V, and a positional relation between the optical system and the imaging visual field V at each position is illustrated with the side face of the optical system 30 illustrated outside the subject SP.

Figure 8:
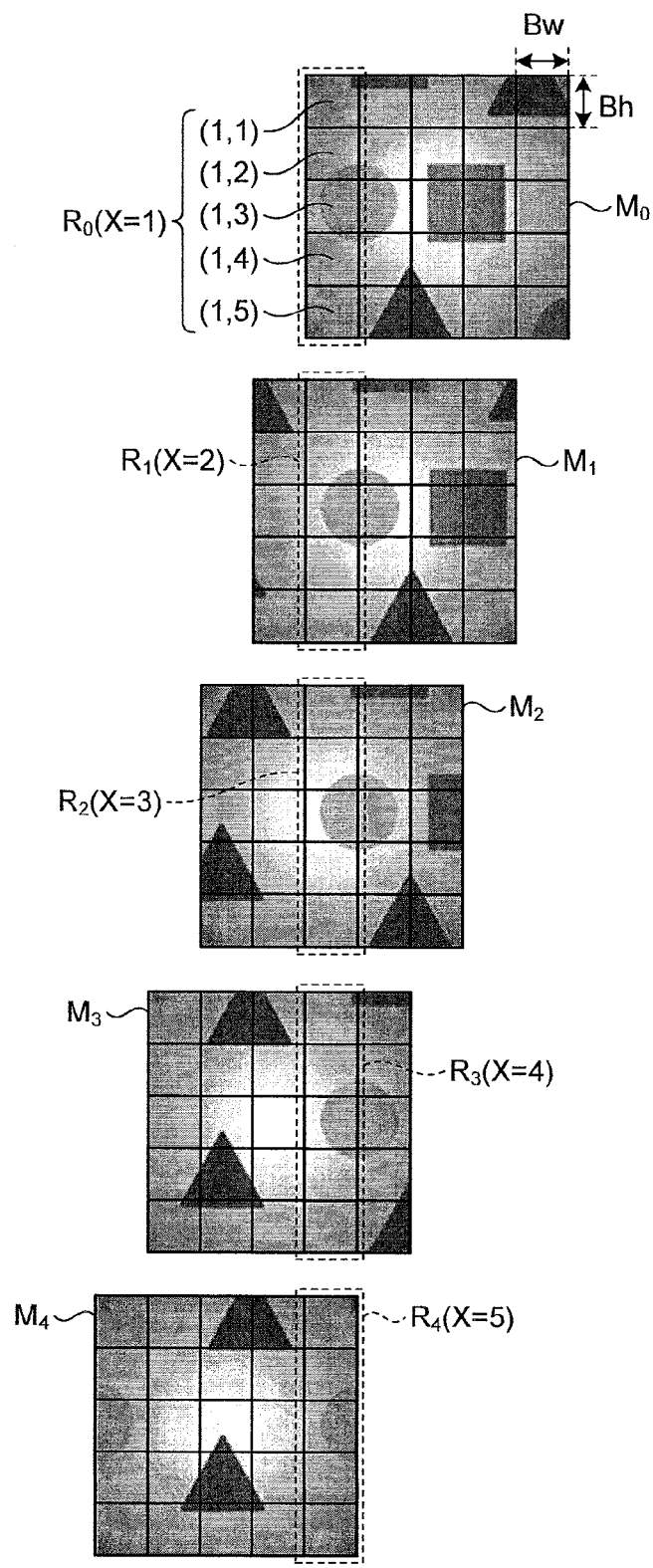
FIG. 8 is a schematic diagram that illustrates five images acquired by performing imaging five times while the imaging visual field is moved in the horizontal direction.

The image acquiring unit 11, as illustrated in FIG. 6, by performing imaging every time when the imaging visual field V is moved in the horizontal direction by a length Bw, sequentially acquires a plurality of images $M_j$ (here, j=0, 1, 2, . . . ) each having a part of the imaging visual field V overlapping with the most recently generated image. FIG. 8 is a schematic diagram that illustrates five images $M_0$ to $M_4$ acquired by performing imaging five times while the imaging visual field V is moved in the horizontal direction. In FIG. 8, the images $M_0$ to $M_4$ are vertically aligned according to the imaging order and are arranged to be horizontally shifted such that blocks having a common texture component are vertically uniform.

In addition, the image acquiring unit 11, as illustrated in FIG. 7, by performing imaging every time when the imaging visual field V is moved in the vertical direction by a length Bh, sequentially acquires a plurality of images $M_k$ (here, k=0, 1, 2, . . . ) each having a part of the imaging visual field V overlapping with the most recently acquired image.

In order to change the position of the imaging visual field V with respect to the subject SP, it may be configured such that the position of the subject SP is fixed, and the optical system 30 side is moved or configured such that the position of the optical system 30 is fixed, and the subject SP side is moved. Alternatively, both the subject SP and the optical system 30 may be configured to be moved in opposite directions.

Between the plurality of images $M_j$ acquired by moving the imaging visual field V in the horizontal direction and the plurality of images $M_k$ acquired by moving the imaging visual field V in the vertical direction, images in which the whole or a part of the subject within the imaging visual field V is the same may be included, or images in which the whole or a part of the subject is the same may not be included at all.

In the following Step S2, the shading component calculating unit 121 takes in the plurality of images acquired in Step S1 and calculates a shading component for each of the horizontal direction and the vertical direction by using such images.

Here, generally, the calculation of the shading component is performed using the luminance of an area (hereinafter, referred to as a flat area) in which a shading component is hardly generated within the image and a change in the shading component is hardly seen as the reference. More specifically, by eliminating the luminance of each pixel included an area that is a calculation target for the shading component using the luminance of each pixel included in a flat area having a texture component common to the area that is the calculation target, a shading component can be acquired.

In contrast, in the first embodiment, a shading component is calculated for each column or each row by using the luminance of a column or a row of blocks including the flat area as the reference. For example, between images acquired by moving the imaging visual field V in the horizontal direction by one block each time, a common area is generated in the horizontal direction in units of columns. Accordingly, in this case, a shading component is calculated based on the luminance of blocks of a column that includes the flat area and is aligned in the vertical direction with respect to the flat area. Hereinafter, in this way, a shading component (the ratio of luminance) calculated based on a common area generated in the horizontal direction will be referred to as a shading component of the horizontal direction. On the other hand, between images acquired by moving the imaging visual field V in the vertical direction by one block each time, a common area is generated in the vertical direction in units of rows. Accordingly, in this case, a shading component is calculated based on the luminance of blocks of a row that includes the flat area and is aligned in the horizontal direction with respect to the flat area. Hereinafter, in this way, a shading component (the ratio of luminance) calculated based on a common area generated in the vertical direction will be referred to as a shading component of the vertical direction.

In the first embodiment, as illustrated in FIG. 3C, a flat area is present in a center portion of an image, and the process is performed such that shading components are changed in a concentric pattern. More specifically, among blocks (1,1) to (5,5) acquired by dividing an image M, a block (3,3) located at the center is assumed to be a flat area.

First, the first-direction shading component calculating unit 121a extracts a column including the block (3,3) of the flat area from a certain image among images $M_0$ to $M_4$ illustrated in FIG. 8, extracts blocks (in other words, a common area) in which the same subject as that of such blocks is shown from another image, and calculates a shading component of the horizontal direction by using luminance of pixels of corresponding positions between blocks extracted from both images.

More specifically, since blocks (1,1), (1,2), (1,3), (1,4), and (1,5) included in a first column $R_0(X=1)$ of the image $M_0$ and blocks (3,1), (3,2), (3,3), (3,4), and (3,5) included in a third column $R_2(X=3)$ of the image $M_2$ are common areas, texture components of pixels of corresponding positions between such blocks are common. Accordingly, a shading component of each pixel disposed within a block of the first column is calculated by dividing the luminance of the pixel disposed within the block of the first column $R_0(X=1)$ of the image $M_0$ by the luminance of a pixel, which is a pixel disposed within a block of the third column $R_2(X=3)$ of the image $M_2$, of a corresponding position.

Hereinafter, shading components of arbitrary pixels disposed within the blocks (1,1), (1,2), (1,3), (1,4), and (1,5) will be respectively represented as shading components Sh(1,1), Sh(1,2), Sh(1,3), Sh(1,4), and Sh(1,5). In addition, luminance of arbitrary pixels disposed within the blocks (1,1), (1,2), (1,3), (1,4), and (1,5) of the image $M_0$ will be respectively represented as luminance $H_0(1,1)$, $H_0(1,2)$, $H_0(1,3)$, $H_0(1,4)$, and $H_0(1,5)$. Furthermore, luminance of arbitrary pixels disposed within the blocks (3,1), (3,2), (3,3), (3,4), and (3,5) of the third column of the image $M_2$ will be respectively represented as luminance $H_2(3,1)$, $H_2(3,2)$, $H_2(3,3)$, $H_2(3,4)$, and $H_2(3,5)$. By using these, the shading components Sh(1,1) to Sh(1,5) of arbitrary pixels disposed within blocks (1,1) to (1,5) are given by the following Equations (1a) to (1e).

$$Sh(1, 1) = \frac{H_0(1, 1)}{H_2(3, 1)} \quad (1a)$$

$$Sh(1, 2) = \frac{H_0(1, 2)}{H_2(3, 2)} \quad (1b)$$

$$Sh(1, 3) = \frac{H_0(1, 3)}{H_2(3, 3)} \quad (1c)$$

$$Sh(1, 4) = \frac{H_0(1, 4)}{H_2(3, 4)} \quad (1d)$$

$$Sh(1, 5) = \frac{H_0(1, 5)}{H_2(3, 5)} \quad (1e)$$

Equations (1a) to (1e) represent that the shading component of an arbitrary pixel within each block is given by dividing the luminance of the pixel disposed within a block represented in a numerator on the right side by the luminance of a pixel of a corresponding position within the block represented in a denominator. Hereinafter, as represented in Equations (1a) to (1e), calculation relating to pixels of corresponding positions between different blocks is comprehensively represented in the form of a calculation equation between blocks.

By putting the Equations (1a) to (1e) together, the shading component of an arbitrary pixel disposed within a block (X=1) of the first column is given by the following Equation (1-1) by using the luminance $H_0(X=1)$ of the pixel disposed within the block of the first column of the image $M_1$ and the luminance $H_2(X=3)$ of a pixel of a corresponding position within the block of the third column of the image $M_2$.

$$Sh(X = 1) = \frac{H_0(X = 1)}{H_2(X = 3)} \quad (1-1)$$

Equation (1-1) represents that the shading components Sh(1,1), Sh(1,2), Sh(1,3), Sh(1,4), and Sh(1,5) (these will be collectively referred to as Sh(X=1)) of arbitrary pixels within each block of the first column are given by dividing luminance $H_0(1,1)$, $H_0(1,2)$, $H_0(1,3)$, $H_0(1,4)$, and $H_0(1,5)$ (these will be collectively referred to as $H_0(X=1)$) of arbitrary pixels of the first column of the image $M_0$ by the luminance $H_2(3,1)$, $H_2(3,2)$, $H_2(3,3)$, $H_2(3,4)$, and $H_2(3,5)$ (these will be collectively referred to as $H_2(X=3)$) of pixels of corresponding positions in the third column of the image $M_2$.

Similarly, also the shading components Sh(X=2), Sh(X=3), Sh(X=4), and Sh(X=5) in arbitrary pixels within blocks disposed in second to fifth columns are given by the following Equations (1-2), (1-3), (1-4), and (1-5). As shown in Equation (1-3), the shading component Sh(X=3) of each pixel disposed within a block of the third column is calculated between the luminance values of the same pixel disposed within the same block, and thus is equal to 1.0.

$$Sh(X = 2) = \frac{H_1(X = 2)}{H_2(X = 3)} \quad (1-2)$$

$$Sh(X = 3) = \frac{H_2(X = 3)}{H_2(X = 3)} = 1.0 \quad (1-3)$$

$$Sh(X = 4) = \frac{H_3(X = 4)}{H_2(X = 3)} \quad (1-4)$$

$$Sh(X = 5) = \frac{H_4(X = 5)}{H_2(X = 3)} \quad (1-5)$$

Figure 9:
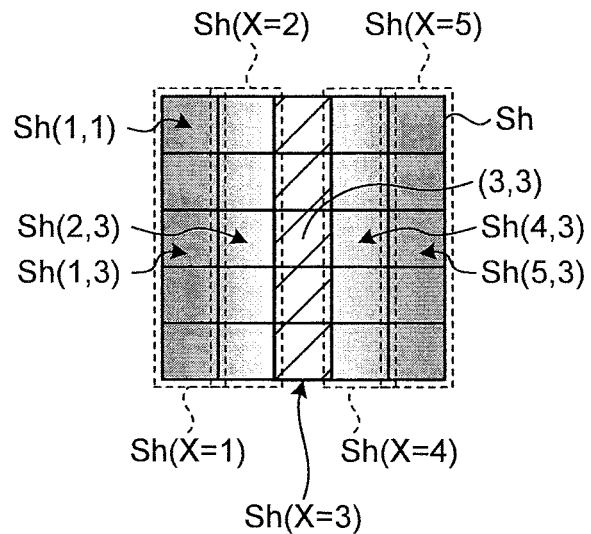
FIG. 9 is a schematic diagram that illustrates a horizontal-direction shading component stored in a storage unit illustrated in FIG. 1.

The shading components Sh(X=1) to Sh(X=5) calculated in this way are sequentially stored in a predetermined storage area of the storage unit 13. FIG. 9 is a schematic diagram that illustrates a shading component Sh of the horizontal direction stored in the storage unit 13. In FIG. 9, diagonal-line shading is applied to a column (in other words, a column used as the reference for the calculation of a shading component) including a flat area at the center.

Here, among the shading components Sh(X=1), Sh(X=2), Sh(X=4), and Sh(X=5) illustrated in FIG. 9, shading components Sh(1,3), Sh(2,3), Sh(4,3), and Sh(5,3) of arbitrary pixels within blocks of the third row are calculated using the luminance of pixels of corresponding positions within the block (3,3) that is a flat area as the reference. Thus, hereinafter, shading components calculated using the luminance of pixels disposed within blocks of the flat area will be referred to as normalized shading components.

In contrast, among the shading components Sh(X=1), Sh(X=2), Sh(X=4), and Sh(X=5), shading components of arbitrary pixels disposed within blocks of first, second, fourth, and fifth rows are calculated using luminance of pixels of corresponding positions disposed within blocks (3,1), (3,2), (3,4), (3,5) other than the flat area in the third columns as the reference. For example, as represented in Equation (1a), the shading component Sh(1,1) of the block (1,1) is calculated using the luminance $H_2$(3,1) of a pixel disposed within the block (3,1). Hereinafter, a shading component calculated using the luminance of a pixel disposed in a block other than the flat area will be referred to as a non-normalized shading component.

Similarly, the second-direction shading component calculating unit 121b calculates shading components of the vertical direction based on five images acquired by imaging the subject SP five times while moving the imaging visual field V in the vertical direction by a length Bh each time. In other words, from a certain image among such five images, a row including a block (3,3) of a flat area is extracted, and from another image, a block (common area) in which the same subject as that of such a block is shown is extracted, and shading components of the vertical direction are calculated by using the luminance of pixels of corresponding positions between the blocks extracted from both the images.

Figure 10:
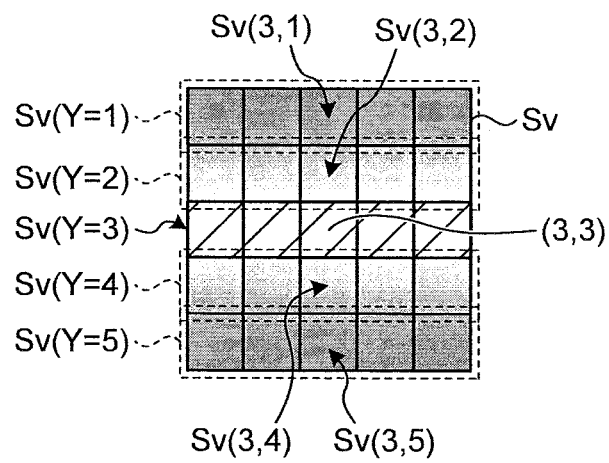
FIG. 10 is a schematic diagram that illustrates vertical-direction shading components stored in the storage unit illustrated in FIG. 1.

FIG. 10 is a schematic diagram that illustrates vertical-direction shading components Sv stored in the storage unit 13. In FIG. 10, diagonal-line shading is applied to a row (in other words, a row used as the reference for the calculation of a shading component) including a flat area at the center.

Here, among the shading components Sv (Y=1), Sv (Y=2), Sv (Y=4), and Sv (Y=5) illustrated in FIG. 10, shading components Sv(3,1), Sv(3,2), Sv(3,4), and Sv(3,5) of arbitrary pixels within blocks of the third column are normalized shading components calculated using the luminance of pixels of corresponding positions within the block (3,3) that is a flat area as the reference. In contrast, among the shading components Sv (Y=1), Sv (Y=2), Sv (Y=4), and Sv (Y=5), shading components of arbitrary pixels within blocks of the first, second, fourth, and fifth columns are non-normalized shading components calculated using the luminance of pixels of corresponding positions within blocks (1,3), (2,3), (4,3), and (5, 3) other than the flat area although the components are also in the third row.

In the description presented above, while, after images are acquired by respectively moving the imaging visual field in the horizontal direction and the vertical direction in Step S1, the calculation of shading components of the horizontal direction and the vertical direction are sequentially performed in Step S2, the processing sequence is not limited thereto. For example, it may be configured such that, after an image is acquired by moving the imaging visual field in the horizontal direction, the calculation of shading components of the horizontal direction is performed using the acquired image, and subsequently, after an image is acquired by moving the imaging visual field in the vertical direction, and the calculation of shading components in the vertical direction is performed by using the acquired image. At this time, the calculation of the shading components of the horizontal direction, and the acquisition of an image of which the imaging visual field is moved in the vertical direction may be performed together. In addition, each process for the vertical direction may be performed before each process for the horizontal direction.

Figure 11A:
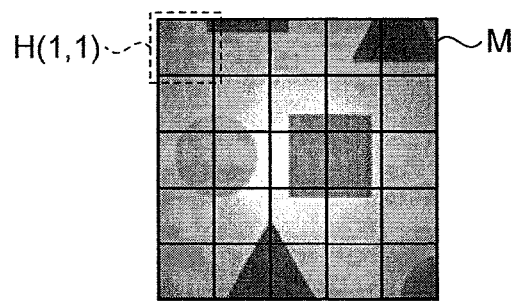
FIGS. 11A to 11C are schematic diagrams illustrating an image correcting process performed by an image correcting unit illustrated in FIG. 1.
Figure 11B:
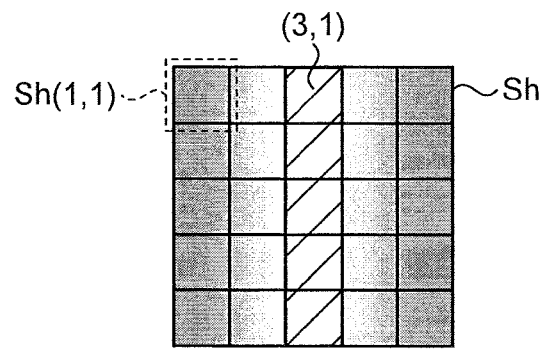
Figure 11C:
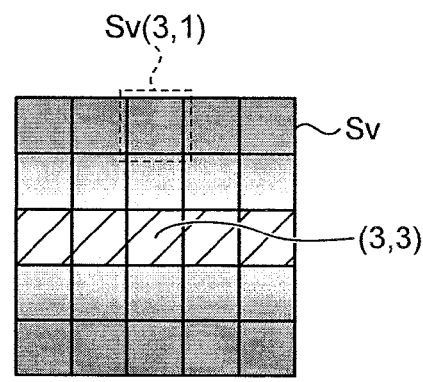

In the following Step S3, the image correcting unit 122 corrects an arbitrary image acquired in Step S1 by using the shading components of the horizontal direction and the vertical direction calculated in Step S2. FIGS. 11A to 11C are schematic diagrams illustrating an image correcting process performed by the image correcting unit 122. Here, as an example, a case will be described in which an image M illustrated in FIG. 11A is a correction target image. Hereinafter, the luminance of an arbitrary pixel disposed within a block (X,Y) within the image M will be referred to as H(X,Y).

Figure 12:
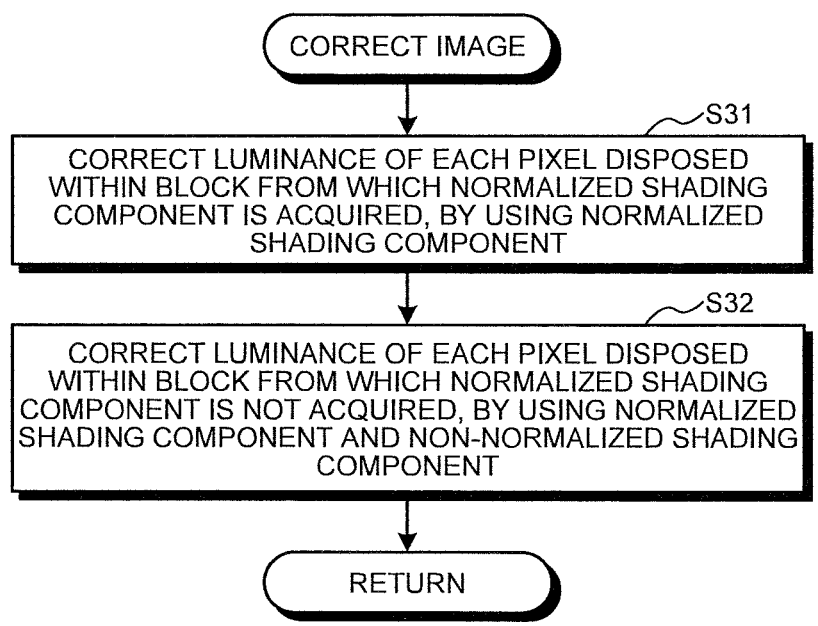
FIG. 12 is a flowchart that illustrates the image correcting process performed by the image correcting unit illustrated in FIG. 1 in detail.

FIG. 12 is a flowchart that illustrates the image correcting process performed by the image correcting unit 122 in detail. In Step S31, the first image correcting unit 122a corrects the luminance of each pixel disposed within the block from which a normalized shading component is acquired in the image M by using a normalized shading component.

In case of the first embodiment, blocks from which normalized shading components Sh of the horizontal direction (see FIG. 9) are acquired are blocks (1,3), (2,3), (4,3), and (5, 3), and blocks from which normalized shading components Sv of the vertical direction (see FIG. 10) are acquired are blocks (3,1), (3,2), (3,4), and (3,5). Thus, when a block of a flat area is ($X_0, Y_0$), blocks from which normalized shading components are acquired can be represented as (X,$Y_0$) or ($X_0$,Y).

The first image correcting unit 122a corrects the luminance H(X,$Y_0$) of an arbitrary pixel disposed within a block (X,$Y_0$) from which the normalized shading component Sh of the horizontal direction is acquired by using the normalized shading component Sh(X,$Y_0$) at the pixel position, thereby calculating a texture component T(X,$Y_0$) of the pixel (see Equation (2-1)). In addition, the first image correcting unit 122a corrects the luminance H($X_0$,Y) of an arbitrary pixel disposed within the block ($X_0$,Y) from which the normalized shading component Sv of the vertical direction is acquired by using the normalized shading component Sv($X_0$,Y) at the pixel position, thereby calculating a texture component T($X_0$,Y) of the pixel (see Equation (2-2)).

$$T(X, Y_0) = \frac{H(X, Y_0)}{Sh(X, Y_0)} \qquad (2\text{-}1)$$

$$T(X_0, Y) = \frac{H(X_0, Y)}{Sv(X_0, Y)} \qquad (2\text{-}2)$$

In the following Step S32, the second image correcting unit 122b corrects the luminance of each pixel disposed within the block of the image M from which the normalized shading component is not acquired by using the normalized shading component and the non-normalized shading component.

For example, a case will be considered in which a shading correction is performed for an arbitrary pixel disposed within a block (1,1) illustrated in FIG. 11A A shading component Sh(1,1) calculated for the pixel disposed within the block (1,1), as illustrated in FIG. 11B and Equation (1a), is a non-normalized shading component calculated using the luminance $H_2$(3,1) of a pixel of a corresponding position within a block (3,1) that is a common area of the block (1,1) in the horizontal direction as the reference. A shading component included in the luminance $H_2$(3,1) of a pixel disposed within the block (3,1), as illustrated in FIG. 11C, is given as a normalized shading component Sv(3,1) calculated using the luminance of a pixel of a corresponding position within the block (3, 3) of the flat area that is a common area of the block (3,1) in the vertical direction as the reference. Thus, a texture component T(1,1) of an arbitrary pixel disposed within the block (1,1) of the image M is given by the following Equation (3) by using the luminance H(1,1) of the pixel disposed within the block (1,1) of the image M, the non-normalized shading component Sh(1,1) at the pixel position, and the normalized shading component Sv(3,1) of a corresponding pixel position within the block (3,1).

$$T(1,1) = H(1,1) \times \frac{1}{Sh(1,1)} \times \frac{1}{Sv(3,1)} \quad (3)$$

Figure 13A:
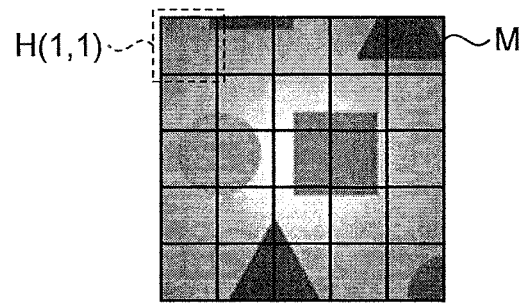
FIGS. 13A to 13C are schematic diagrams illustrating another example of a shading correcting process performed by a second image correcting unit illustrated in FIG. 1.
Figure 13B:
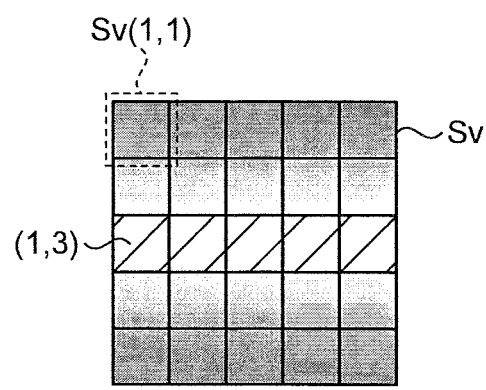
Figure 13C:
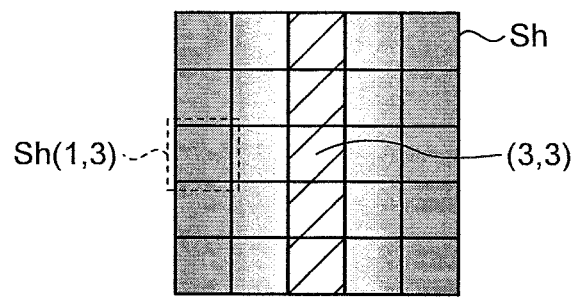

FIGS. 13A to 13C are schematic diagrams illustrating another example of a shading correcting process performed by the second image correcting unit 122b. Another shading component Sv(1,1) calculated for an arbitrary pixel disposed within a block (1,1) that is a correction target illustrated in FIG. 13A, as illustrated in FIG. 13B, is a non-normalized shading component calculated using the luminance of a pixel of a corresponding position within a block (1,3) that is a common area of the vertical direction of the block (1,1) as the reference. A shading component included in the luminance of a pixel disposed within the block (1,3), as illustrated in FIG. 13C, is given as a normalized shading component Sh(1,3) calculated using the luminance of a pixel of a corresponding position within a block (3,3) of a flat area that is a common area of the block (1,3) in the horizontal direction as the reference. Thus, a texture component T(1,1) of an arbitrary pixel within the block (1,1) of the image M is given by the following Equation (4) using the luminance H(1,1) of the pixel within the block (1,1) in the image M, the non-normalized shading component Sv(1,1) at the pixel position, and the normalized shading component Sh(1,3) at a corresponding pixel position within the block (1,3).

$$T(1,1) = H(1,1) \times \frac{1}{Sv(1,1)} \times \frac{1}{Sh(1,3)} \quad (4)$$

Such a calculation equation will be generalized using a block $(X_0, Y_0)$ of a flat area. In an image M, a texture component T(X,Y) of an arbitrary pixel disposed within a block (X,Y) from which a normalized shading component is not acquired is given by the following Equation (5) using the luminance H(X,Y) of a pixel disposed within the block (X,Y), a non-normalized shading component Sh(X,Y) calculated using the luminance of a horizontal-direction common area of the block (X,Y) as the reference, and a normalized shading component $Sv(X_0,Y)$ calculated using the luminance of a flat area that is a vertical-direction common area of the common area as the reference.

$$T(X,Y) = H(X,Y) \times \frac{1}{Sh(X,Y)} \times \frac{1}{Sv(X_0,Y)} \quad (5)$$

Alternatively, in the image M, a texture component T(X,Y) of an arbitrary pixel disposed within a block (X,Y) from which a normalized shading component is not acquired is given by the following Equation (6) using the luminance H(X,Y) of a pixel disposed within the block (X,Y), a non-normalized shading component Sv(X,Y) calculated using the luminance of a vertical-direction common area of the block (X,Y) as the reference, and a normalized shading component $Sh(X,Y_0)$ calculated using the luminance of a flat area that is a horizontal-direction common area of the common area as the reference.

$$T(X,Y) = H(X,Y) \times \frac{1}{Sv(X,Y)} \times \frac{1}{Sh(X,Y_0)} \quad (6)$$

Thereafter, the process is returned to a main routine, and the operation of the image processing device 1 ends.

The order of performing Steps S31 and S32 is not limited to the order described above. Thus, Step S32 may be performed first, or Steps S31 and S32 may be performed parallel.

As described above, according to the first embodiment, the number of images required for the calculation of shading components can be decreased to be lower than that of a conventional case. Accordingly, the number of times of performing imaging at the time of acquiring such images can be decreased, and a shading correction having high precision can be performed in a short time by employing a simple configuration. In addition, according to the first embodiment, since the imaging visual field is moved only in two directions of the horizontal and vertical directions, the control of a stage on which a subject SP is place or the control of the optical system can be simplified.

In addition, in the description presented above, while the imaging visual field is moved, and shading components are calculated, or the number of divisions of a block that is a unit for performing an image correction is 5×5=25, the number of divisions of an image (imaging visual field) is not limited thereto. As the number of divisions is increased, a more delicate shading correction can be performed. On the other hand, as the number of divisions is decreased, the number of times of imaging a subject SP and the amount of calculation performed in the shading component calculating process and the image correcting process can be suppressed, and accordingly, a total time required for the shading correction can be shortened.

Furthermore, in the description presented above, when a texture component is calculated using Equations (2-1), (2-2), and (5) or (6), in other words, when the shading correction is performed, the luminance is multiplied by a reciprocal (shading correction gain) of the shading component given by Equations (1a) to (1e) and (1-1) to (1-5). In this calculation, by replacing the numerator and the denominator of the right side represented in Equations (1a) to (1e) and (1-1) to (1-5) giving the shading components with each other and directly calculating the shading correction gain in Equations (2-1), (2-2), (5), and (6), the amount of calculation can be decreased.

First Modified Example

A first modified example of the first embodiment of the present invention will be described.

In the first embodiment described above, the shading component calculating unit 121 calculates a normalized shading component and a non-normalized shading component of each of the horizontal direction and the vertical direction, and the image correcting unit 122 calculates a texture component by using Equation (2-1), (2-2), (5), or (6) in accordance with a block that is a correction target by using such shading components. However, the shading component calculating unit 121 may generate a map in which a shading component S(X,Y) that can be applied to the calculation equation of the same texture component without using the block that is the correction target and store the map in the storage unit 13.

More specifically, for a block $(X,Y_0)$ from which a normalized shading component $Sh(X,Y_0)$ of the horizontal direction is acquired, the normalized shading component is stored in a map as a shading component $S(X,Y)$. In addition, for a block $(X_0,Y)$ from which a normalized shading component $Sv(X_0,Y)$ of the vertical direction is acquired, the normalized shading component is stored in the map as a shading component $S(X,Y)$. For a block from which non-normalized shading components $Sh(X,Y)$ and $Sv(X,Y)$ are acquired, a value $Sh(X,Y) \times Sv(X_0,Y)$ or $Sv(X,Y) \times Sh(X,Y_0)$ calculated using one of the non-normalized shading components and the normalized shading component is stored in the map as a shading component $S(X,Y)$.

In this case, the image correcting unit 122 may calculate a texture component $T(X,Y)$ (=$H(X,Y)/S(X,Y)$) by using the shading component $S(X,Y)$ that is generated by the shading component calculating unit 121 and is stored in the map.

Second Embodiment

Next, a second embodiment of the present invention will be described.

The configuration of an image processing device according to the second embodiment is similar to that of the first embodiment (see FIG. 1) as a whole, but details of the shading component calculating process performed by a first-direction shading component calculating unit 121a and a second-direction shading component calculating unit 121b are different from those of the first embodiment.

Figure 14:
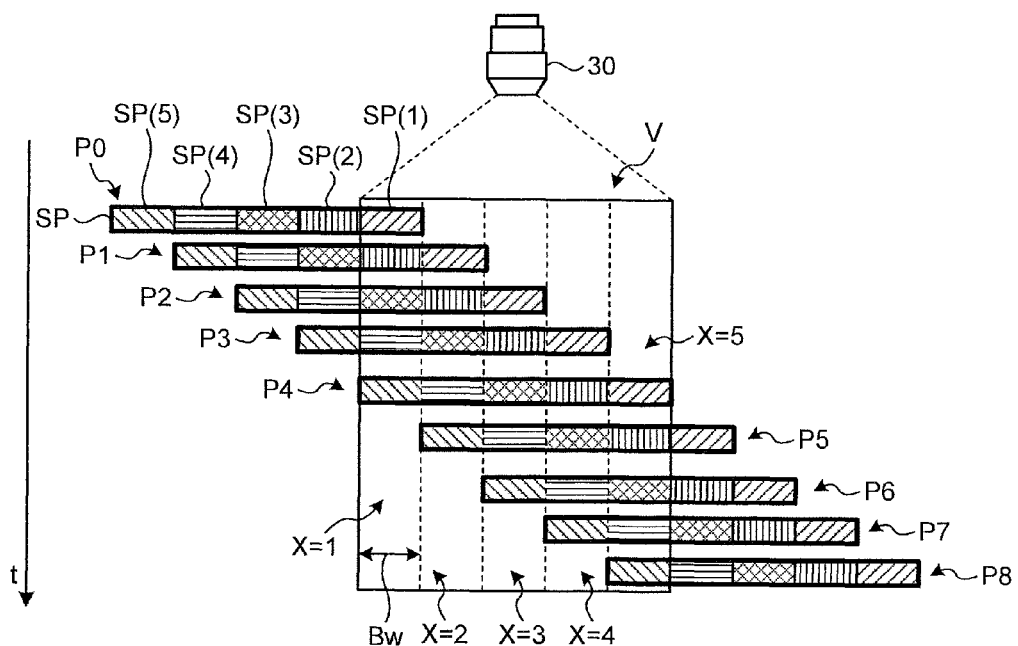
FIG. 14 is a schematic diagram that illustrates a method of capturing an image used for calculating shading components according to a second embodiment of the present invention.

FIG. 14 is a schematic diagram that illustrates a method of capturing an image used for calculating shading components according to the second embodiment and illustrates changes in relative horizontal-direction positions P0, P1, . . . of a subject SP with respect to an imaging visual field V of an optical system 30 as a time series (t). In FIG. 14, areas acquired by dividing the subject SP by each length Bw in the horizontal direction are represented as subject areas SP(1) to SP(5).

In the first embodiment described above, in each of the horizontal direction and the vertical direction, five images are acquired by performing imaging five times while relatively moving the imaging visual field V of the optical system 30 with respect to the subject SP by the length Bw (or the length Bh) each time. In contrast, in the second embodiment, nine images are acquired in one direction by performing imaging nine times while relatively moving the imaging visual field V by a same length Bw (or a length Bh).

Figure 15:
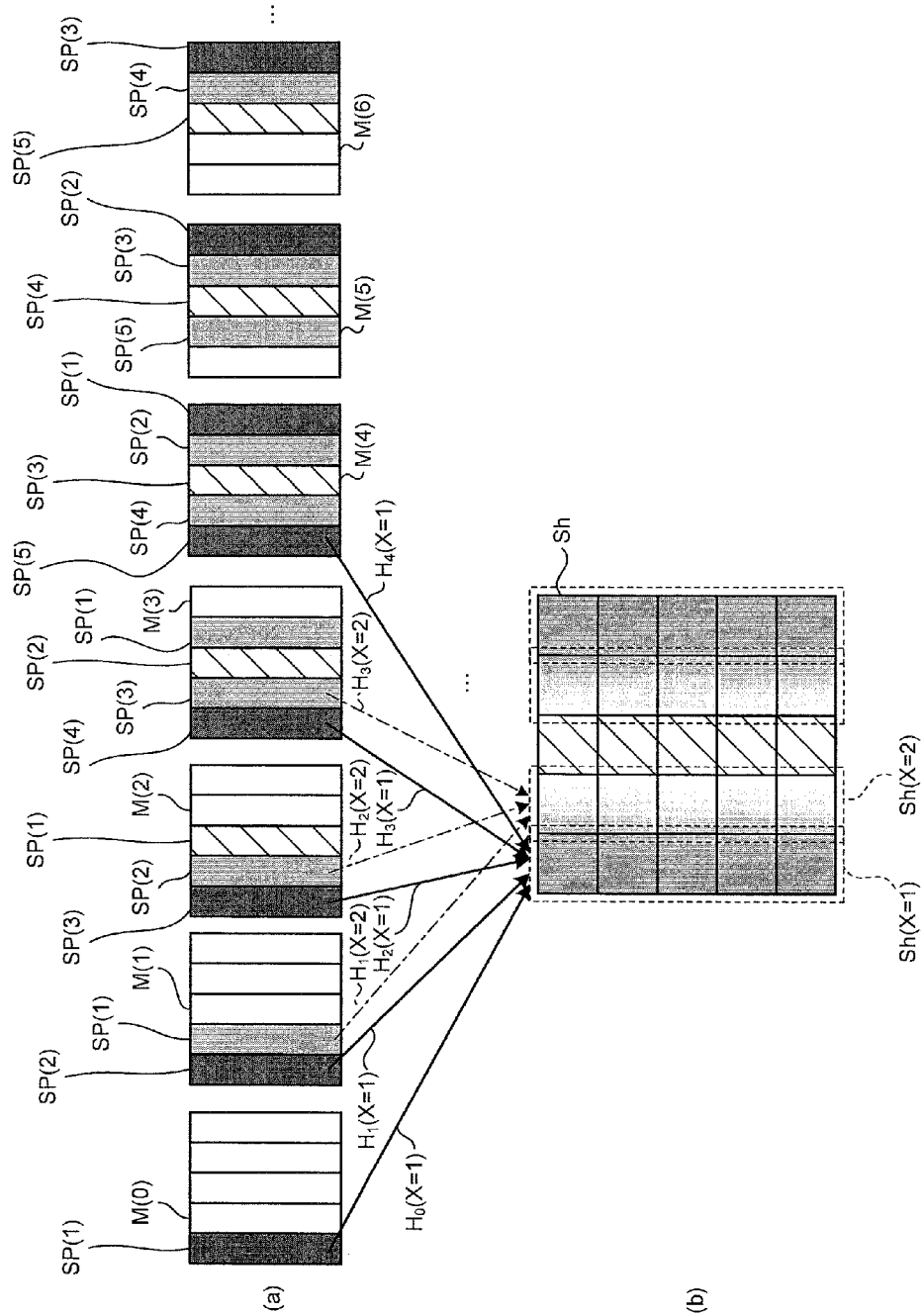
FIG. 15 is a schematic diagram that illustrates a method of calculating shading components according to the second embodiment of the present invention.

FIG. 15 is a schematic diagram that illustrates a method of calculating shading components according to the second embodiment. Images M(0), M(1), . . . illustrated in (a) of FIG. 15 are captured in a case where the subject SP illustrated in FIG. 14 is located at relative positions P0, P1, . . . . In (b) of FIG. 15, shading components Sh of the horizontal direction stored in a storage unit 13 are shown.

As illustrated in FIGS. 14 and 15(a), in a case where a shading component of an arbitrary pixel disposed within a column X=1 is acquired, the luminance of the pixel disposed within the column X=1 of the image M(0) in which the subject area SP(1) is shown and the luminance of a pixel of a corresponding position disposed within a column X=3 of the image M(2) that is the common area may be used, or the luminance of the pixel disposed within the column X=1 of the image M(1) in which the subject area SP(2) is shown and the luminance of a pixel of a corresponding position disposed within the column X=3 of the image M(3) that is the common area may be used. In addition, the luminance of the pixel disposed within the column X=1 of the image M(2) in which the subject area SP(3) is shown and a pixel of a corresponding position disposed within a column X=3 of the image M(4) that is the common area may be used, or the luminance of the pixel disposed within the column X=1 of the image M(3) in which the subject area SP(4) is shown and the luminance of a pixel of a corresponding position disposed within the column X=3 of the image M(5) that is the common area may be used. Furthermore, the luminance of the pixel disposed within the column X=1 of the image M(4) in which the subject area SP(5) is shown and the luminance of a pixel of a corresponding position disposed within a column X=3 of the image M(6) that is the common area may be used. In other words, for the column X=1, based on five methods of combining (combinations of images) common areas each having a different texture component, five kinds of shading components can be calculated. This similarly applies to the other columns.

Thus, by using the luminance of a plurality of columns having different texture components for one column, it can be understood that shading components having a higher degree of robustness can be calculated. More specifically, the shading components $Sh(X=1)$ to $Sh(X=5)$ of arbitrary pixels disposed within each column are given by the following Equations (7-1) to (7-5).

$$Sh(X=1) = \frac{H_0(X=1) + H_1(X=1) + H_2(X=1) + H_3(X=1) + H_4(X=1)}{H_2(X=3) + H_3(X=3) + H_4(X=3) + H_5(X=3) + H_6(X=3)} \quad (7\text{-}1)$$

$$Sh(X=2) = \frac{H_1(X=2) + H_2(X=2) + H_3(X=2) + H_4(X=2) + H_5(X=2)}{H_2(X=3) + H_3(X=3) + H_4(X=3) + H_5(X=3) + H_6(X=3)} \quad (7\text{-}2)$$

$$Sh(X=3) = \frac{H_2(X=3) + H_3(X=3) + H_4(X=3)\ H_5(X=3) + H_6(X=3)}{H_2(X=3) + H_3(X=3) + H_4(X=3) + H_5(X=3) + H_6(X=3)} = 1.0 \quad (7\text{-}3)$$

$$Sh(X=4) = \frac{H_3(X=4) + H_4(X=4) + H_5(X=4) + H_6(X=4) + H_7(X=4)}{H_2(X=3) + H_3(X=3) + H_4(X=3) + H_5(X=3) + H_6(X=3)} \quad (7\text{-}4)$$

$$Sh(X=5) = \frac{H_4(X=5) + H_5(X=5) + H_6(X=5) + H_7(X=5) + H_8(X=5)}{H_2(X=3) + H_3(X=3) + H_4(X=3) + H_5(X=3) + H_6(X=3)} \quad (7\text{-}5)$$

Here, focusing on the first term of the numerator and the first term of the denominator of each equation, similar to Equation (1a), a form representing the ratio of the luminance of a pixel disposed within a left-end row (X=1) of a certain image and the luminance of a pixel disposed within a center row (X=3) that is a common area of the left-end row can be seen. This similarly applies to the second terms and later terms of the numerator and the denominator. In other words, Equations (7-1) to (7-5) may be regarded as averaging a plurality of shading components calculated based on common areas having different texture components.

As an actual process performed by the first-direction shading component calculating unit 121a, as illustrated in FIGS. 14 and 15, when an image is taken in from the image acquiring unit 11, the luminance of each pixel within the image is accumulated in a predetermined storage area of the storage unit 13. More specifically, in a storage area corresponding to a first column of the shading component Sh, luminance $H_0(X=1)$, $H_1(X=1)$, $H_2(X=1)$, $H_3(X=1)$, and $H_4(X=1)$ of pixels disposed within a block of the first column of the images M(0) to M(4) are sequentially accumulated for every pixels having corresponding positions between such columns. In addition, in a storage area corresponding to a second column of the shading component Sh, luminance $H_1(X=2)$, $H_2(X=2)$, $H_3(X=2)$, $H_4(X=2)$, and $H_5(X=2)$ of pixels disposed within a block of the second column of the images M(1) to M(5) are sequentially accumulated for every pixels having corresponding positions between such columns. Similarly, in a storage area corresponding to a third column of the shading component Sh, luminance $H_2(X=3)$, $H_3(X=3)$, $H_4(X=3)$, $H_5(X=3)$, and $H_6(X=3)$ of pixels disposed within a block of the third column of the images M(2) to M(6) are sequentially accumulated for every pixels having corresponding positions between such columns. This similarly applies to the fourth row and the fifth row.

In this way, after the luminance of the pixels disposed within the images M(0) to M(9) are accumulated in the predetermined storage area, the first-direction shading component calculating unit 121a divides the accumulated value of the luminance of each column by the accumulated value of the luminance of the center column (X=3). In this way, a shading component having a high degree of robustness can be acquired.

The second-direction shading component calculating unit 121b can calculate a shading component of the vertical direction by performing a process similar to that of the first-direction shading component calculating unit 121a.

As described above, according to the second embodiment, shading components having a high degree of robustness can be calculated. Accordingly, a correction having high precision can be stably performed without depending on the characteristics of the texture component of the correction target image. In addition, according to the second embodiment, since the shading component is calculated after the luminance is accumulated for each column or row, a new memory does not need to be additionally installed, and the calculation process can be performed in a simple manner.

In addition, in the second embodiment, while the shading components are calculated based on nine images acquired by performing imaging nine times while moving the imaging visual field V in each direction eight times, by further repeating the moving of the imaging visual field and the imaging, more images may be used. In this way, the degree of robustness of the shading components can be further improved.

Second Modified Example

A second modified example of the second embodiment of the present invention will be described.

By individually calculating a plurality of kinds of shading components from a plurality of combinations of common areas relating to each column as described above and additionally averaging such shading components, a horizontal-direction shading component of the column may be acquired. For example, for the column X=1, based on five methods of combining common areas of the column X=1 of the image M(0) and the column X=3 of the image M(2), the column X=1 of the image M(1) and the column X=3 of the image M(3), the column X=1 of the image M(2) and the column X=3 of the image M(4), the column X=1 of the image M(3) and the column X=3 of the image M(5), and the column X=1 of the image M(4) and the column X=3 of the image M(6), five kinds of shading components are calculated, and an average thereof is calculated. This is similar for a shading component of the vertical direction.

Third Embodiment

Next, a third embodiment of the present invention will be described.

The configuration of an image processing device according to the third embodiment is similar to that of the first embodiment (see FIG. 1) as a whole, but details of the shading component calculating process performed by a first-direction shading component calculating unit 121a and a second-direction shading component calculating unit 121b are different from those of the first embodiment.

Figure 16:
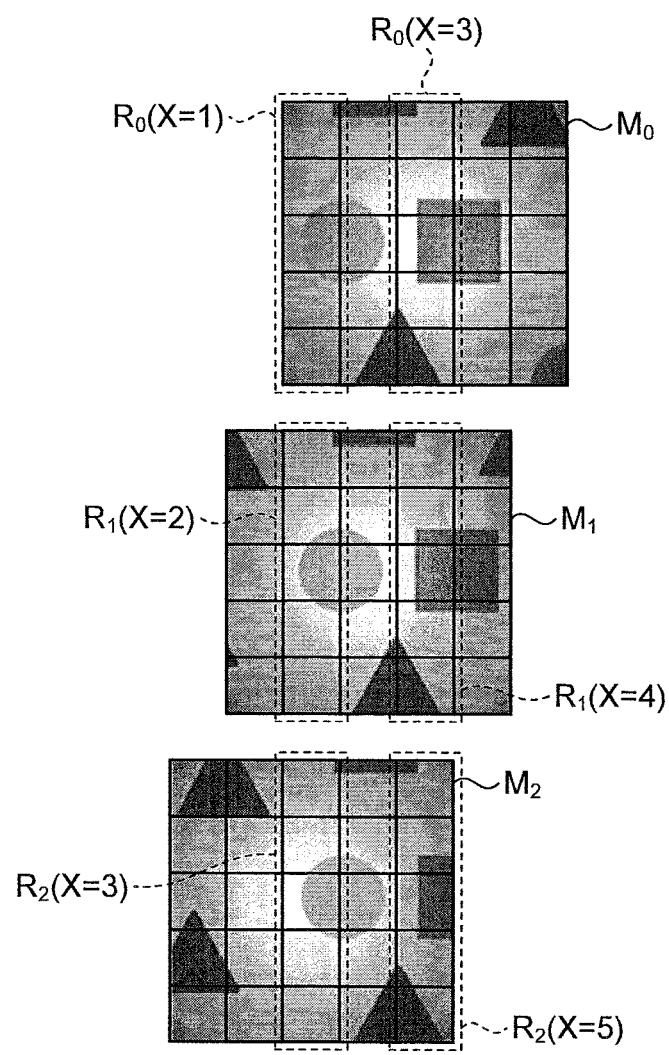
FIG. 16 is a schematic diagram that illustrates a method of calculating a shading component according to a third embodiment of the present invention.

FIG. 16 is a schematic diagram illustrating a method of calculating shading components according to the third embodiment and, as illustrated in FIG. 6, illustrates three images acquired by performing imaging three times while moving the imaging visual field V in the horizontal direction by a length Bw each time.

In the third embodiment, the first-direction shading component calculating unit 121a calculates horizontal-direction shading components by using the following Equations (8-1) to (8-5) with the symmetry of common areas among three images $M_0$ to $M_2$ in the horizontal direction focused on.

$$Sh(X=1) = \frac{H_0(X=1)}{H_2(X=3)} \qquad (8\text{-}1)$$

$$Sh(X=2) = \frac{H_1(X=2)}{H_2(X=3)} \qquad (8\text{-}2)$$

$$Sh(X=3) = \frac{H_2(X=3)}{H_2(X=3)} = \frac{H_0(X=3)}{H_0(X=3)} = 1.0 \qquad (8\text{-}3)$$

$$Sh(X=4) = \frac{H_1(X=4)}{H_0(X=3)} \qquad (8\text{-}4)$$

$$Sh(X=5) = \frac{H_2(X=5)}{H_0(X=3)} \qquad (8\text{-}5)$$

In other words, a shading component Sh(X=1) of an arbitrary pixel included in the first column is calculated (see Equation (8-1)) using the luminance $H_0(X=1)$ of the pixel disposed within a block $R_0(X=1)$ of the first column of the image $M_0$ and the luminance $H_2(X=3)$ of a pixel of a corresponding position within a block $R_2(X=3)$ of the third column of the image $M_2$ that is a common area. In addition, a shading component Sh(X=2) of an arbitrary pixel included in the second column is calculated (see Equation (8-2)) using the luminance $H_1(X=2)$ of the pixel disposed within a block $R_1(X=2)$ of the second column of the image $M_1$ and the luminance $H_2(X=3)$ of the pixel of the corresponding position within the block $R_2(X=3)$ of the third column of the image $M_2$ that is the common area thereof. A shading component Sh(X=4) of an arbitrary pixel included in the fourth column is calculated (see Equation (8-4)) using the luminance $H_1(X=4)$ of the pixel disposed within a block $R_1(X=4)$ of the fourth column of the image $M_1$ and the luminance $H_0(X=3)$ of a pixel of a corresponding position within the block $R_0(X=3)$ of the third column of the image $M_0$ that is the common area thereof. A shading component $Sh(X=5)$ of an arbitrary pixel included in the fifth column is calculated (see Equation (8-5)) using the luminance $H_2(X=5)$ of the pixel disposed within a block $R_2(X=5)$ of the fifth column of the image $M_2$ and the luminance $H_0(X=3)$ of the pixel of the corresponding position within the block $R_0(X=3)$ of the third column of the image $M_0$ that is the common area thereof. In addition, the shading component of each pixel included in the third column, as represented in Equation (8-3), $Sh(X=3)=1.0$.

The second-direction shading component calculating unit 121b can calculate shading components in the vertical direction from three images by performing a process similar to that of the first-direction shading component calculating unit 121a.

A method of correcting an image using the normalized shading components and the non-normalized shading components of each of the horizontal direction and the vertical direction calculated in this way is similar to that of the first embodiment (see FIGS. 11A to 13C). Alternatively, similar to the first modified example of the first embodiment, it may be configured such that a map in which shading components are stored is generated, and an image is corrected using this map.

As described above, according to the third embodiment, the number of times of moving the imaging visual field V and the number of times of performing imaging can be decreased, and accordingly, a shading correction can be performed in a further shorter time.

Fourth Embodiment

Next, a fourth embodiment of the present invention will be described.

Figure 17:
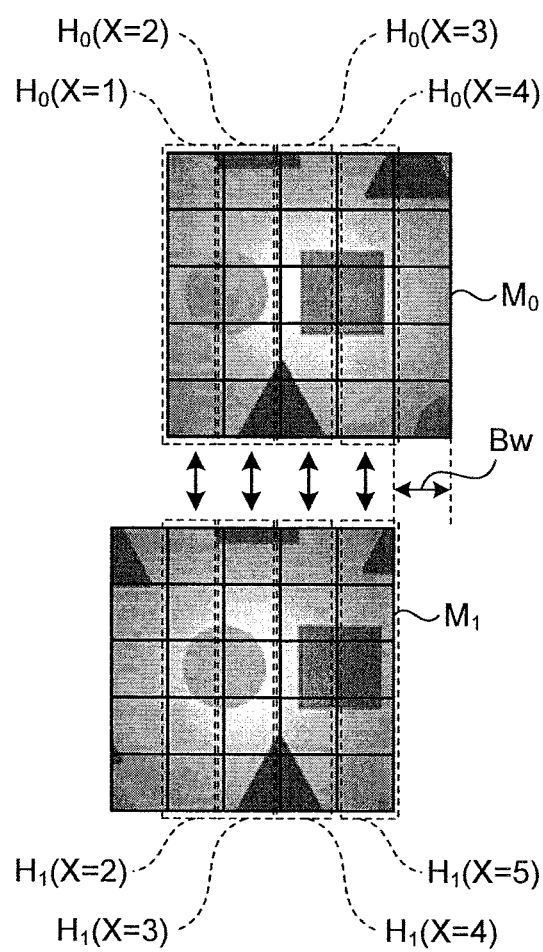
FIG. 17 is a schematic diagram that illustrates a method of calculating shading components according to a fourth embodiment of the present invention.

The configuration of an image processing device according to the fourth embodiment is similar to that of the first embodiment (see FIG. 1) as a whole, but details of the shading component calculating process performed by a first-direction shading component calculating unit 121a and a second-direction shading component calculating unit 121b are different from those of the first embodiment. FIG. 17 is a schematic diagram that illustrates a method of calculating shading components according to the fourth embodiment.

First, as illustrated in FIG. 6, a case will be considered in which an image $M_0$ is acquired by performing imaging with the imaging visual field V matched to a certain area disposed within a subject SP, and subsequently, an image $M_1$ is acquired by performing imaging with the imaging visual field V shifted by a length Bw in the horizontal direction. At this time, the length Bw is set such that a sufficient common area is secured between the image $M_0$ and the image $M_1$, and more particularly, at least the center portion of the image that is a flat area is included in common areas of both the images $M_0$ and MN. FIG. 17 illustrates images $M_0$ and $M_1$ acquired by performing such imaging, and a column $X=1$ of the image $M_0$ and a column $X=2$ of the image $M_1$ are common areas.

Here, in the fourth embodiment, a shading component can be calculated using one pair of images acquired by shifting the imaging visual field V in the horizontal direction, and accordingly, the imaging visual field V does not need to be shifted two or more times in units of defined blocks. For this reason, as described above, in a case where the condition of the length Bw described above is satisfied, the imaging visual field V can be shifted by a user arbitrary moving a stage on which the subject SP is placed in the horizontal direction. In this case, an arbitrary stage moving amount is the length Bw corresponding to one block. Alternatively, a shift amount between one pair of images selected from among a group of images consecutively acquired while moving the stage in the horizontal direction may be set as the length Bw. In such a case, by dividing the length w of the image in the horizontal direction by the length Bw of one block, the number of divisions of blocks in the horizontal direction is determined.

The luminance $H_0(X=1)$ of an arbitrary pixel included in a column $X=1$ of the image $M_0$ is configured by a texture component $T_0(X=1)$ and a shading component $Sh(X=1)$ of the pixel. In other words, $H_0(X=1)=T_0(X=1)\times Sh(X=1)$. Suppose that the luminance of a pixel, which shares a common subject with the arbitrary pixel and is included in a column $X=2$ of the image $M_1$, is denoted by $H_1(X=2)$, the luminance $H_1(X=2)$ is configured by a texture component $T_1(X=2)$ and a shading component $Sh(X=2)$ of the pixel. In other words, $H_1(X=2)=T_2(X=2)\times Sh(X=2)$.

As described above, since the column $X=1$ of the image $M_0$ and the column $X=2$ of the image $M_1$ are common areas, texture components $T_0(X=1)$ and $T_1(X=2)$ are the same. Accordingly, the following Equation (9-1) is satisfied.

$$\frac{H_0(X=1)}{Sh(X=1)} = \frac{H_1(X=2)}{Sh(X=2)} \quad (9\text{-}1)$$

$$Sh(X=1) = \frac{H_0(X=1)}{H_1(X=2)} \times Sh(X=2)$$

Similarly, by using that the column $X=2$ of the image $M_0$ and the column $X=3$ of the image $M_1$, the column $X=3$ of the image $M_0$ and the column $X=4$ of the image $M_1$, and the column $X=4$ of the image $M_0$ and the column $X=5$ of the image $M_1$ are respectively common areas, Equations (9-2) to (9-4) representing the shading components $Sh(X=2)$, $Sh(X=3)$, and $Sh(X=4)$ of arbitrary pixels included in the columns $X=2$, $X=3$, and $X=4$ are acquired.

$$Sh(X=2) = \frac{H_0(X=2)}{H_1(X=3)} \times Sh(X=3) \quad (9\text{-}2)$$

$$Sh(X=3) = \frac{X_0(X=3)}{X_1(X=4)} \times Sh(X=4) \quad (9\text{-}3)$$

$$Sh(X=4) = \frac{H_0(X=4)}{H_1(X=5)} \times Sh(X=5) \quad (9\text{-}4)$$

Here, when the shading component $Sh(X=3)=1.0$ is substituted into Equations (9-1) to (9-4) by using the shading component $Sh(X=3)$ of each pixel disposed within the center column $X=3$ including the flat area (3,3) as the reference, and the equations are arranged, Equations (10-1) to (10-5) representing the shading components $Sh(X=1)$ to $Sh(X=5)$ of arbitrary pixels included in the columns are acquired.

$$Sh(X=1) = \frac{H_0(X=1)}{H_1(X=2)} \times Sh(X=2) \quad (10\text{-}1)$$

-continued $$Sh(X=2) = \frac{H_0(X=2)}{H_1(X=3)} \quad (10\text{-}2)$$

$$Sh(X=3) = 1.0 \quad (10\text{-}3)$$

$$Sh(X=4) = \frac{H_1(X=4)}{H_0(X=3)} \quad (10\text{-}4)$$

$$Sh(X=5) = \frac{H_1(X=5)}{H_0(X=4)} \times Sh(X=4) \quad (10\text{-}5)$$

As represented in Equation (10-2), the shading component $Sh(X=2)$ is given by the luminance $H_0(X=2)$ and $H_1(X=3)$. In addition, as represented in Equation (10-1), the shading component $Sh(X=1)$ is given by the shading component $Sh(X=2)$ calculated using Equation (10-2) and the luminance $H_0(X=1)$ and $H_1(X=2)$. Furthermore, as represented in Equation (10-4), the shading component $Sh(X=4)$ is given by the luminance $H_0(X=3)$ and $H_1(X=4)$. In addition, as represented in Equation (10-5), the shading component $Sh(X=5)$ is given by the shading component $Sh(X=4)$ calculated using Equation (10-4) and the luminance $H_0(X=4)$ and $H_1(X=5)$. In other words, as represented in Equations (10-1) to (10-5), a shading component Sh of an arbitrary pixel included in each column can be calculated using the luminance of pixels disposed within the two images $M_0$ and $M_1$.

In other words, if a shading component ($Sh(X=3)$) for a partial area in the image (for example, the column X=3) is known (1.0 in a flat area), an unknown shading component ($Sh(X=4)$) can be calculated by using the ratio ($H_1(X=4)/H_0(X=3)$) between the luminance ($H_0(X=3)$) of a pixel disposed within an area (the column X=3) in which the shading component of the inside of one image (for example, the image $M_0$) is known and the luminance ($H_1(X=4)$) of a pixel of a corresponding position in an area (X=4) of the inside of the other image (image $M_1$) in which a subject common to the area is shown and the known shading component ($Sh(X=3)$). By sequentially repeating such calculation, the shading components of the whole image can be acquired.

On the other hand, the second-direction shading component calculating unit 121b acquires a shading component from an image acquired by performing imaging with the imaging visual field V matched to a certain area of the inside of the subject SP and an image (see FIG. 7) acquired by shifting the imaging visual field V by a predetermined distance (for example, a length Bh corresponding to one block; see FIG. 5) in the vertical direction with respect to the image. Also in such a case, the length Bh is set such that a sufficient common area is secured between both the images, and more specifically, at least a center portion of the image that is a flat area is included in the common area.

Also in this case, similar to the case of the horizontal direction, in a case where the condition of the length Bh described above is satisfied, the imaging visual field V may be shifted by a user arbitrarily moving a stage on which the subject SP is placed in the vertical direction. At this time, an arbitrary stage moving amount is the length Bh corresponding to one block. Alternatively, a shift amount between one pair of images selected from among a group of images consecutively acquired while moving the stage in the vertical direction may be set as the length Bh. In such a case, by dividing the length h of the image in the vertical direction by the length Bh of one block, the number of divisions of blocks in the vertical direction is determined.

One of images before and after the shift of the imaging visual field V may be also used as one of the images $M_0$ and $M_1$ used for the calculation by the first-direction shading component calculating unit 121a. In other words, substantially, only one image acquired by shifting the imaging visual field V in the vertical direction with respect to the image $M_0$ or $M_1$ may be newly acquired.

Then, the second-direction shading component calculating unit 121b calculates a shading component Sh of each pixel included in each row (Y=1, Y=2, Y=3, Y=4, and Y=5) by performing calculation similar to the method of calculating shading components of the horizontal direction described above.

A method of correcting an image by using the normalized shading components and the non-normalized shading components of each of the horizontal direction and the vertical direction calculated in this way is similar to that of the first embodiment (see FIGS. 11A to 13C). Alternatively, similar to the first modified example of the first embodiment, it may be configured such that a map in which shading components are stored is generated, and the image is corrected using this map.

As described above, according to the fourth embodiment, the shading components of the whole image can be calculated based on images of two sets having a sufficient common area in each of the horizontal direction and the vertical direction. Then, since one image of each set can be also used as an image of the other set, the shading components of the whole image can be calculated based on at least three images. In order to acquire images having a common area, it is not necessary to precisely control the shift amounts of the imaging visual field in the horizontal direction and the vertical direction, and accordingly, for example, in a microscope system, the embodiment is not limited to a motor-driven stage but can be realized in a manual stage in a simplified manner.

In addition, in the fourth embodiment, while the horizontal-direction shading components are calculated from one pair of images acquired by shifting the visual field in the horizontal direction, it may be configured such that a plurality of horizontal-direction shading components at a same pixel position are calculated from a plurality of pairs of images acquired by shifting the imaging visual field V in the horizontal direction, and a final horizontal-direction shading component Sh is acquired by calculating an average or the like of such horizontal-direction shading components. At this time, the shift amounts of the plurality of pairs of images in the horizontal direction may be arbitrary. In this way, a decrease in the accuracy of the shading components due to degradation of an image such as a random noise, halation, or black defects can be suppressed.

Also when the vertical-direction shading component is acquired, similarly, it may be configured such that a plurality of vertical-direction shading components at a same pixel position are calculated from a plurality of pairs of images acquired by shifting the imaging visual field V in the vertical direction, and a final vertical-direction shading component Sv is acquired by calculating an average or the like of such vertical-direction shading components.

Fifth Embodiment

Next, a fifth embodiment of the present invention will be described.

The configuration of an image processing device according to the fifth embodiment is similar to that of the first embodiment (see FIG. 1) as a whole, but details of the shading component calculating process performed by a shading component calculating unit 121 are different from those of the first embodiment.

In the first embodiment described above, while the texture component T(X,Y) of an arbitrary pixel disposed within a block from which a normalized shading component is not acquired is calculated using one of Equations (5) and (6), the shading component calculating unit 121 may calculate a combined shading component acquired by weighing and combining the shading components used in such Equations (5) and (6) in advance.

Here, for a block (X,Y) that is a correction target, a shading component configured by a non-normalized shading component Sh(X,Y) calculated using a block of the common area of the horizontal direction as the reference and a normalized shading component Sv($X_0$,Y) calculated using a block (3,3) of a flat area that is a common area of the vertical direction of the block of the common area described above as the reference is set as a shading component $Shv_1$(X,Y) (see Equation (11)).

$$Shv_1(X,Y) = Sh(X,Y) \times Sv(X_0, Y) \qquad (11)$$

In addition, for a block (X,Y) that is a correction target, a shading component configured by a non-normalized shading component Sv(X,Y) calculated using a block of the common area of the vertical direction as the reference and a normalized shading component Sh(X,$Y_0$) calculated using the block (3,3) of the flat area that is the common area of the horizontal direction of the block of the common area described above as the reference is set as a shading component $Shv_2$(X,Y) (see Equation (12)).

$$Shv_2(X,Y) = Sv(X,Y) \times Sh(X, Y_0) \qquad (12)$$

The combined shading component S(X,Y) acquired by weighting and combining such shading components $Shv_1$(X,Y) and $Shv_2$(X,Y) is given by the following Equation (13).

$$S(X,Y) = (1 - w(X,Y)) \times Shv_1(X,Y) + w(X,Y) \times Shv_2(X,Y) \qquad (13)$$

In Equation (13), w(X,Y) is a weight used for combining the shading components. Generally, since the shading component can be regarded to be smooth, the weight w(X,Y), as shown in the following Equation (14), for example, can be determined based on a ratio between total sums of edge amounts.

$$w(X, Y) = \alpha \times \frac{Edge_h[Sh(X, Y)] + Edge_v[Sv(X_0, Y)]}{Edge_h[Sh(X, Y_0)] + Edge_v[Sv(X, Y)]} \qquad (14)$$

In Equation (14), a parameter α is a normalization coefficient. In addition, $Edge_h$[ ] represents a total sum of horizontal-direction edge amounts in a target area (block (X,Y) or (X,$Y_0$)) for the distribution of horizontal-direction shading components. $Edge_v$[ ] represents a total sum of vertical-direction edge amounts in a target area (block ($X_0$,Y) or (X,Y)) for the distribution of vertical-direction shading components.

For example, in a case where a total sum of edge amounts in blocks (X,Y) and ($X_0$,Y) used for the calculation of the shading component $Shv_1$(X,Y) is less than a total sum of edge amounts in blocks (X,$Y_0$) and ($X_0$,Y) used for the calculation of the shading component $Shv_2$(X,Y), the value of the weight w(X,Y) is also decreased. Accordingly, the extent of contribution of the shading component $Shv_1$ in Equation (13) is increased.

As represented in Equation (14), by setting the weight w(X,Y) based on the edge amount or the contrast, two shading components $Shv_1$ and $Shv_2$ can be combined based on the smoothness thereof. Accordingly, a smoother combined shading component S can be calculated.

In this case, the second image correcting unit 122b calculates a texture component T(X,Y) by using the following Equation (15) for the block (X,Y) from which a normalized shading component is not acquired.

$$T(X, Y) = H(X, Y) \times \frac{1}{S(X, Y)} \qquad (15)$$

As described above, according to the fifth embodiment, a robust shading correction for the shading components regardless of the calculated direction (the horizontal direction or the vertical direction) can be performed.

In the fifth embodiment described above, while a smooth combined shading component S is calculated by setting the weight w(X,Y) by using Equation (14), a further smoother combined shading component S may be configured to be generated by combining a filter process using a median filter, an averaging filter, a Gaussian filter, or the like.

Sixth Embodiment

Next, a sixth embodiment of the present invention will be described. The first to fifth embodiments described above may be combined together.

For example, in a case where the first, third, and fifth embodiments are combined, first, similar to the first embodiment, for each of the horizontal direction and the vertical direction, five images (for example, images $M_0$ to $M_4$) are acquired by performing imaging five times while moving the imaging visual field V. Then, based on such five images, shading components of the horizontal direction and the vertical direction are calculated, and, similar to the fifth embodiment, a combined shading component S(X,Y) is calculated for a block from which a normalized shading component is not acquired.

Shading components can be calculated from each of combinations ($M_0$,$M_1$,$M_2$), ($M_1$,$M_2$,$M_3$), and ($M_2$,$M_3$,$M_4$) Of three consecutive images among the images $M_0$ to $M_4$ described above, similar to the third embodiment. Thus, similar to the fifth embodiment, three combined shading components S(X,Y) are calculated by using the shading components respectively calculated from the three combinations. Finally, for one block, a combined shading component based on the five images, and the three combined shading components S(X,Y) based on the combinations of the three images are acquired. By calculating an average of such four combined shading components S(X,Y), a more robust combined shading component can be acquired.

In addition, in a case where the second, third, and the fifth embodiments are combined, similar to the second embodiment, shading components are calculated from nine images, and, similar to the fifth embodiment, a combined shading component S(X,Y) is calculated. Meanwhile, from a combination of three consecutive images from among the nine images described above, similar to the third embodiment, shading components are calculated, and, additionally, similar to the fifth embodiment, a combined shading component S(X,Y) is calculated. Then, a more robust shading component can be calculated by calculating an average of the combined shading component S(X,Y).

Seventh Embodiment

Next, a seventh embodiment of the present invention will be described.

Figure 18:
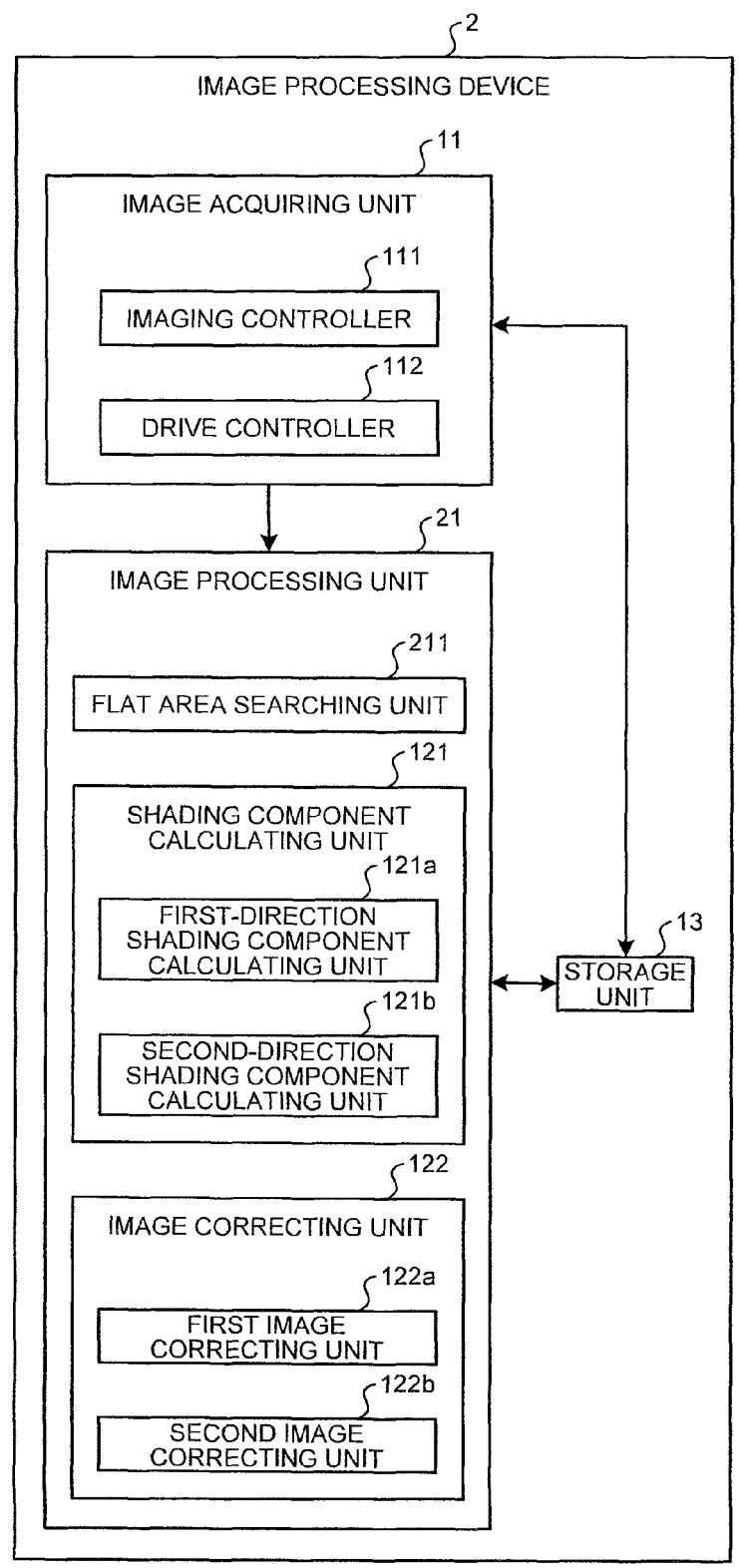
FIG. 18 is a block diagram that illustrates an example of the configuration of an image processing device according to a seventh embodiment of the present invention.

FIG. 18 is a block diagram that illustrates an example of the configuration of an image processing device according to the seventh embodiment. As illustrated in FIG. 18, the image processing device 2 according to the seventh embodiment includes an image processing unit 21 that further includes a flat area searching unit 211 in the image processing unit 12 instead of the image processing unit 12 illustrated in FIG. 1.

Here, in the first to fifth embodiments described above, a center area of an image is regarded as a flat area in which the shading components are uniform, and shading components of areas other than center blocks are calculated. In contrast, in the seventh embodiment, after a search for a flat area from the inside of an image is performed, shading components are calculated.

Before the search for a flat area, the image processing unit 21, similar to the first embodiment, takes in images (for example, in the case of the horizontal direction, the images $M_0$ to $M_4$ illustrated in FIG. 8) acquired by performing imaging while moving the imaging visual field by a predetermined amount each time in each of the horizontal direction and the vertical direction from the image acquiring unit 11.

Figure 19:
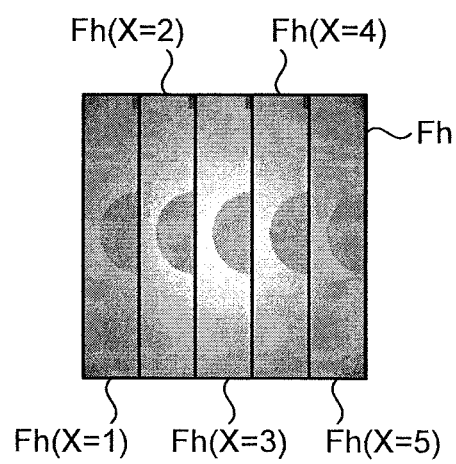
FIG. 19 is a schematic diagram that illustrates a horizontal-direction image generated by a flat area searching unit illustrated in FIG. 18.

The flat area searching unit 211 acquires a horizontal-direction image Fh illustrated in FIG. 19 from among the images $M_0$ to $M_4$ acquired by moving the imaging visual field in the horizontal direction based on the luminance $H_0(X=1)$, $H_1(X=2)$, $H_2(X=3)$, $H_3(X=4)$, and $H_4(X=5)$ of arbitrary pixels included in blocks having a common texture component and stores the horizontal-direction image Fh in a storage unit 13. The luminance of an arbitrary pixel included in each of columns Fh(X=1) to Fh(X=5) constituting the horizontal-direction image Fh is given by the following Equations (16-1) to (16-5).

$$Fh(X=1) = H_0(X=1) \tag{16-1}$$

$$Fh(X=2) = H_1(X=2) \tag{16-2}$$

$$Fh(X=3) = H_2(X=3) \tag{16-3}$$

$$Fh(X=4) = H_3(X=4) \tag{16-4}$$

$$Fh(X=5) = H_4(X=5) \tag{16-5}$$

Figure 20:
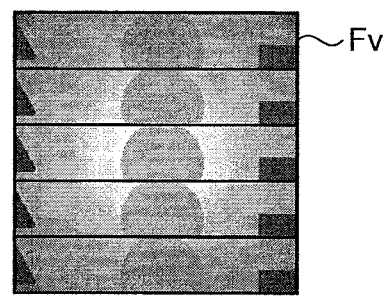
FIG. 20 is a schematic diagram that illustrates a vertical-direction image generated by the flat area searching unit illustrated in FIG. 18.

Similarly, the flat area searching unit 211 acquires a vertical-direction image Fv illustrated in FIG. 20 from among the images acquired by moving the imaging visual field V in the vertical direction based on the luminance of arbitrary pixels included in blocks having a common texture component and stores the vertical-direction image Fv in the storage unit 13.

Figure 21:
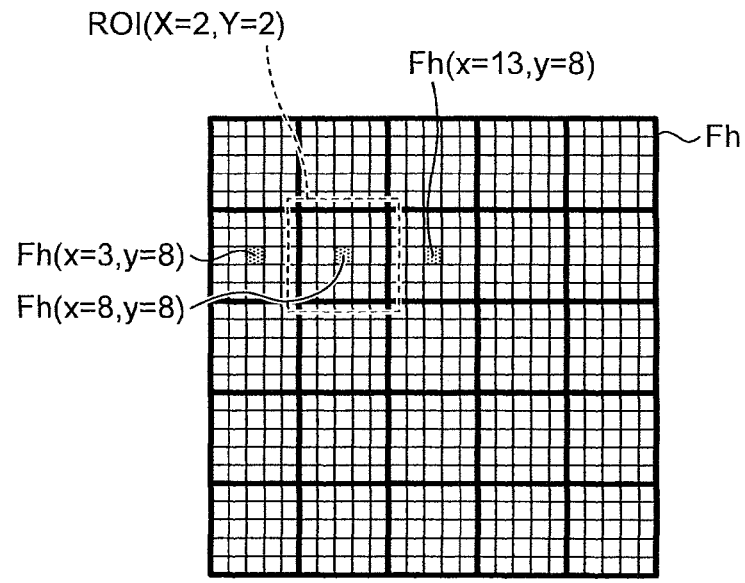
FIG. 21 is a schematic diagram that illustrates the horizontal-direction image illustrated in FIG. 19 in units of pixels.
Figure 22:
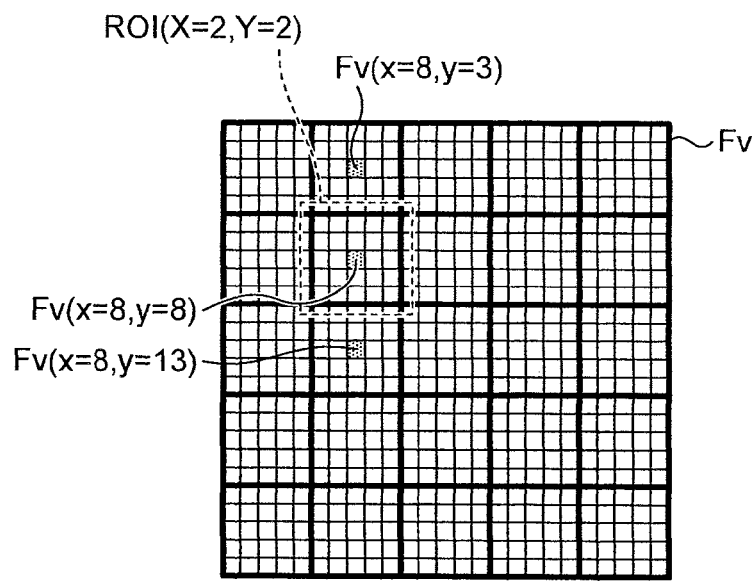
FIG. 22 is a schematic diagram that illustrates the vertical-direction image illustrated in FIG. 20 in units of pixels.

FIG. 21 is a schematic diagram that illustrates the horizontal-direction image Fh illustrated in FIG. 19 in units of pixels. FIG. 22 is a schematic diagram that illustrates the vertical-direction image Fv illustrated in FIG. 20 in units of pixels. In FIGS. 21 and 22, for simplification of description, one block (X,Y) is assumed to be configured by 5 pixels×5 pixels. Hereinafter, in FIGS. 21 and 22, the coordinates of a pixel are denoted by (x,y), and the coordinates of a block are denoted by (X,Y). In addition, a block (X,Y) that is a target for calculating a gradient is denoted by ROI(X,Y).

The flat area searching unit 211 calculates a gradient N(x,y) of a shading component given by the following Equation (17) for each block (X,Y) from the horizontal-direction image Fh and the vertical-direction image Fv.

$$N(x,y) = |Fh(x-Bw,y) - Fh(x,y)| + |Fh(x,y) - Fh(x+Bw,y)| + (Fv(x,y-Bh) - Fv(x,y)| + |Fv(x,y) - Fv(x,y+Bh)| \tag{17}$$

A symbol Bw illustrated in Equation (17) represents a size (length) of each block in the horizontal direction by using the number of pixels. In addition, a symbol Bh illustrated in Equation (17) represents a size (length) of each block in the vertical direction by using the number of pixels (see FIG. 5).

For example, a case will be described in which the gradient N(x,y) of the shading component of an ROI (X=2, Y=2) is calculated. In the horizontal-direction image Fh, a texture component is the same at pixels (x=3, y=8), (x=8, y=8), and (x=13, y=8). For this reason, a change in the luminance at such pixels corresponds to a change in the shading component. In addition, in the vertical-direction image Fv, a texture component is the same at pixels (x=8, y=3), (x=8, y=8), and (x=8, y=13). For this reason, a change in the luminance at such pixels corresponds to a change in the shading component.

Thus, the gradient N(8,8) of the shading component at the center pixel (x=8, y=8) of the ROI (X=2, Y=2) is given by the following Equation (18).

$$N(8,8) = |Sh(3,8) - Sh(8,8)| + |Sh(8,8) - Sh(13,8)| + |Sv(8,3) - Sv(8,8)| + |Sv(8,8) - Sv(8,13)| \tag{18}$$

The flat area searching unit 211 sets the gradient of the shading component at the pixel (x=8, y=8) located at the center of the ROI (X=2, Y=2) as the gradient of the shading component of the ROI (X=2, Y=2). In this way, the flat area searching unit 211 calculates gradients of the shading components for all the blocks except for image corners and determines a block having a smallest gradient as a flat area.

The gradient of the shading component of each block is not limited to the gradient of the shading component of a pixel located at the center of the ROI, but a statistical value (a sum value, an average value, a most frequent value, a median value, or the like) of gradients of shading components of all the pixels within the ROI may be used, or a statistical value (described above) of the gradients of the shading components of some pixels disposed within the ROI may be used.

In a case where an area other than the center area is determined as a flat area by the flat area searching unit 211 as a result of the search, the first-direction shading component calculating unit 121a and the second-direction shading component calculating unit 121b calculate shading components of each direction by using the flat area determined as the result of the search as the reference (in other words, the shading component is regarded to be 1.0), For example, in a case where a block (X=2, Y=2) is a flat area, the first-direction shading component calculating unit 121a calculates shading components Sh(X=1) to Sh(X=5) of the horizontal direction by using the following Equations (19-1) to (19-5) by using blocks of the second column including the flat area as the reference and stores the calculated shading components in the storage unit 13.

$$Sh(X=1) = \frac{H_0(X=1)}{H_1(X=2)} \tag{19-1}$$

$$Sh(X=2) = \frac{H_1(X=2)}{H_1(X=2)} = 1.0 \tag{19-2}$$

$$Sh(X=3) = \frac{H_2(X=3)}{H_1(X=2)} \quad (19\text{-}3)$$

$$Sh(X=4) = \frac{H_3(X=4)}{H_1(X=2)} \quad (19\text{-}4)$$

$$Sh(X=5) = \frac{H_4(X=5)}{H_1(X=2)} \quad (19\text{-}5)$$

Figure 23:
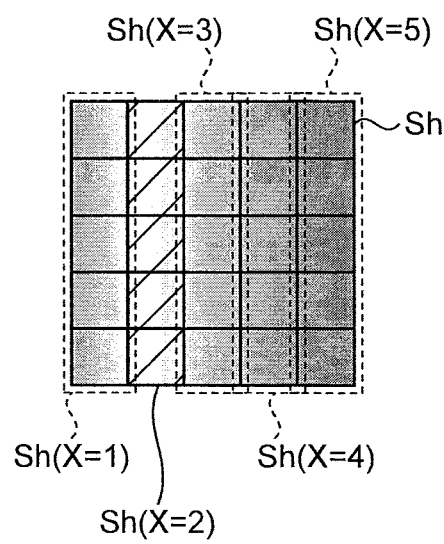
FIG. 23 is a schematic diagram that illustrates shading components of the horizontal direction stored in a storage unit illustrated in FIG. 18.

FIG. 23 is a schematic diagram that illustrates shading components Sh of the horizontal direction stored in the storage unit 13.

Figure 24:
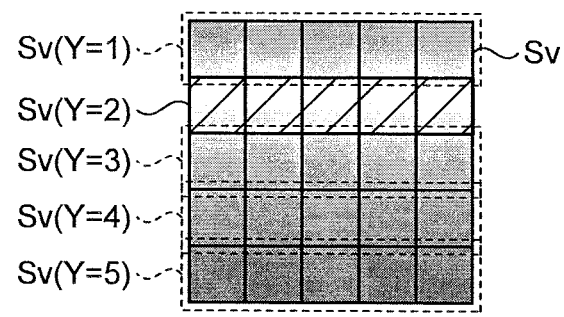
FIG. 24 is a schematic diagram that illustrates shading components of the vertical direction stored in the storage unit illustrated in FIG. 18.

Similarly, the second-direction shading component calculating unit 121b calculates shading components Sv (Y=1) to Sv (Y=5) of the vertical direction by using blocks of the second row including the flat area as the reference and stores the calculated shading components in the storage unit 13. FIG. 24 is a schematic diagram that illustrates shading components Sv of the vertical direction stored in the storage unit 13. In FIGS. 23 and 24, shadings of diagonal lines are applied to the column and the row including the flat area.

In this case, the second image correcting unit 122b calculates a texture component T(X,Y) of a block from which a normalized shading component is not acquired by using the following Equation (20) or (21).

$$T(X,Y) = H(X,Y) \times \frac{1}{Sh(X,Y)} \times \frac{1}{Sv(2,Y)} \quad (20)$$

$$T(X,Y) = H(X,Y) \times \frac{1}{Sh(X,2)} \times \frac{1}{Sv(X,Y)} \quad (21)$$

As described above, according to the seventh embodiment, also in a case where a flat area in which the shading is uniform deviates from the center due to a deviation of an optical axis or the like, a shading correction with high precision can be performed.

In the seventh embodiment described above, while the shading component of each block is calculated by using the shading component of the flat area determined as a result of the search as 1.0, actually, there are cases where the shading component of the flat area is not 1.0. In such cases, the image correcting unit 122 may additionally normalize the texture components calculated through the shading correction using a uniform gain for the whole image.

In addition, in the seventh embodiment described above, while a block including a pixel at which the gradient N(x,y) is minimum is determined as a flat area, it may be configured such that a threshold of the gradient N(x,y) is set, and all the blocks of which the gradients N(x,y) are the threshold or less are determined as flat areas. In such a case, a final shading component may be calculated by weighting and combining the shading components calculated using the flat areas as the reference based on the values of the gradients N(x,y).

Eighth Embodiment

Next, an eighth embodiment of the present invention will be described.

Figure 25:
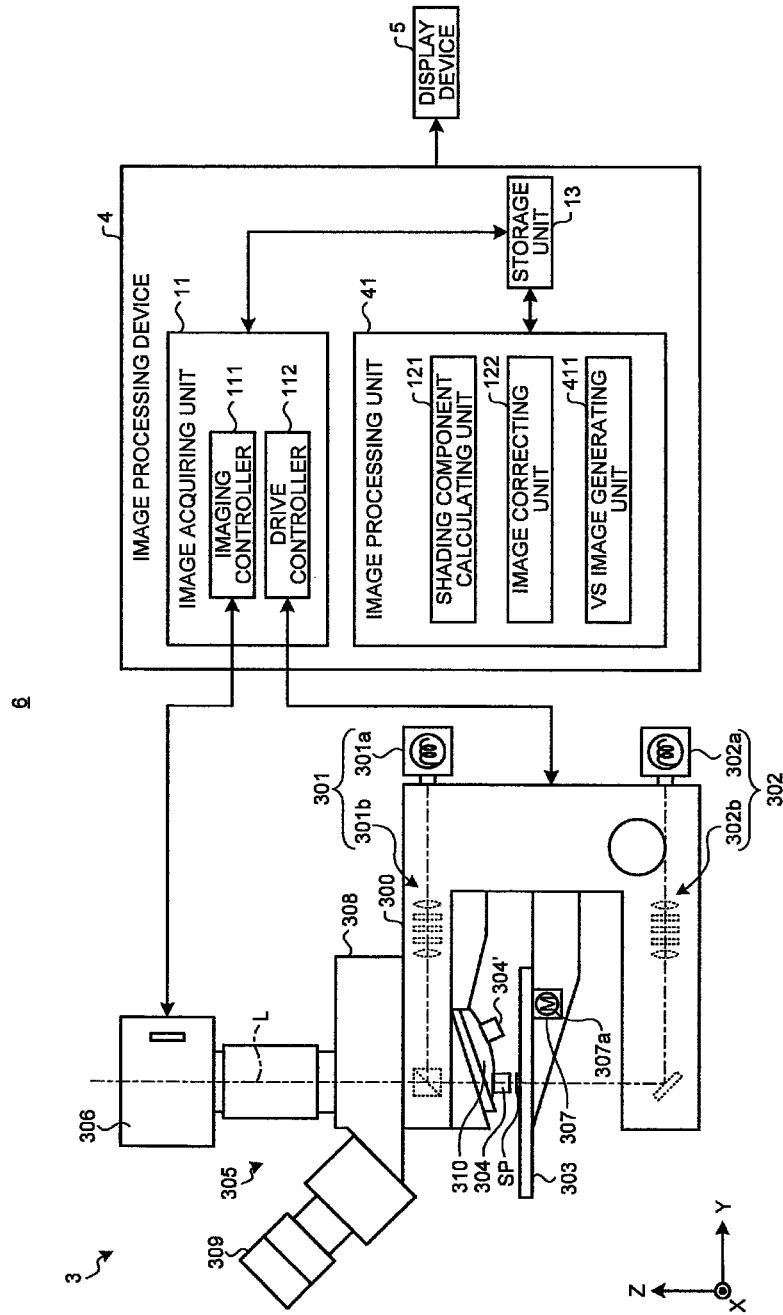
FIG. 25 is a diagram that illustrates an example of the configuration of a microscope system according to an eighth embodiment of the present invention.

FIG. 25 is a diagram that illustrates an example of the configuration of a microscope system according to the eighth embodiment. As illustrated in FIG. 25, a microscope system 6 according to the eighth embodiment includes: a microscope device 3; an image processing device 4; and a display device 5.

The microscope device 3 includes: an arm 300 having an approximate "C" shape in which an epi-illumination unit 301 and a transmitting illumination unit 302 are provided; a specimen stage 303, on which a subject SP that is an observation target is placed, attached to the arm 300; an objective lens 304 that is provided to face the specimen stage 303 through a trinocular tube unit 308 at one end side of a lens barrel 305; an imaging unit 306 that is provided at the other end side of the lens barrel 305; and a stage position changing unit 307 that moves the specimen stage 303. The trinocular tube unit 308 branches observation light of the subject SP incident from the objective lens 304 into the imaging unit 306 and an eyepiece lens unit 309 to be described later. The eyepiece lens unit 309 is used for a user to directly observe the subject SP.

The epi-illumination unit 301 includes an epi-illumination light source 301a and an epi-illumination optical system 301b, and emits epi-illumination light onto the subject SP. The epi-illumination optical system 301b includes various optical members (a filter unit, a shutter, a field stop, and an aperture diaphragm) that collect illumination light emitted from the epi-illumination light source 301a and guides the illumination light in the direction of an observation optical path L.

The transmitting illumination unit 302 includes a transmitting illumination light source 302a and a transmitting illumination optical system 302b and emits transmitting illumination light onto the subject SP. The transmitting illumination optical system 302b includes various optical members (a filter unit, a shutter, a field stop, and an aperture diaphragm) that collect illumination light emitted from the transmitting illumination light source 302a and guides the illumination light in the direction of the observation optical path L.

The objective lens 304 is attached to a revolver 310 that can maintain a plurality of objective lenses (for example, objective lenses 304 and 304') having different magnifications. By changing the objective lens 304 or 304' facing the specimen stage 303 by rotating the revolver 310, the imaging magnification can be changed.

Inside the lens barrel 305, a zoom unit that includes a plurality of zoom lenses and a drive unit (all of them are not illustrated in the drawing) changing the positions of such zoom lenses is provided. The zoom unit enlarges or reduces a subject image within the imaging visual field by adjusting the positions of the zoom lenses. In addition, an encoder may be further provided in the drive unit inside the lens barrel 305. In such a case, it may be configured such that an output value of the encoder is output to the image processing device 4, and the imaging magnification is automatically calculated by detecting the positions of the zoom lenses based on the output value of the encoder in the image processing device 4.

The imaging unit 306 is a camera that includes an image sensor such as a CCD or a CMOS and can capture a color image having pixel levels (pixel values) of bands R (red), G (green), and B (blue) in each pixel provided to the image sensor, and is operated at predetermined timing under the control of the imaging controller 111 of the image processing device 4. The imaging unit 306 receives light (observation light) incident from the objective lens 304 through the optical system provided inside the lens barrel 305, generates image data corresponding to the observation light, and outputs the generated image data to the image processing device 4. Alternatively, the imaging unit 306 may transform pixel values represented in an RGB color space into pixel values represented in a YCbCr color space and output the transformed pixel values to the image processing device 4.

The stage position changing unit 307, for example, includes a ball screw (not illustrated in the drawing) and a stepping motor 307a and changes the imaging visual field by moving the position of the specimen stage 303 within an XY plane. In addition, the stage position changing unit 307 adjusts the focus of the objective lens 304 to the subject SP by moving the specimen stage 303 along a Z axis. The configuration of the stage position changing unit 307 is not limited to the configuration described above, and, for example, may use an ultrasonic motor or the like.

In the eighth embodiment, the position of the optical system including the objective lens 304 is fixed, and the imaging visual field with respect to the subject SP is changed by moving the specimen stage 303. However, a moving mechanism for moving the objective lens 304 within a plane orthogonal to the optical axis may be provided, the specimen stage 303 may be fixed, and the imaging visual field may be changed by moving the objective lens 304. Alternatively, both of the specimen stage 303 and the objective lens 304 may be relatively moved.

The image processing device 4 includes: an image acquiring unit 11; an image processing unit 41; and a storage unit 13. Among these, the configurations and the operations of the image acquiring unit 11 and the storage unit 13 are similar to those according to the first embodiment (see FIG. 1). In the image acquiring unit 11, while a drive controller 112 performs positional control of the specimen stage 303 by directing the drive coordinates of the specimen stage 303 at a pitch determined in advance based on the value of the scale and the like mounted on the specimen stage 303, the positional control of the specimen stage 303 may be performed based on a result of image matching such as template matching based on an image acquired by the microscope device 3. In the eighth embodiment, after the imaging visual field V is moved within the plane of the subject SP in the horizontal direction, the imaging visual field V is only moved in the vertical direction, and accordingly, the control of the specimen stage 303 can be performed very easily.

The image processing unit 41 further includes a VS image generating unit 411 in addition to the image processing unit 12 illustrated in FIG. 1. The VS image generating unit 411 generates a virtual slide (VS) image based on a plurality of images for which a shading correction is performed by the image correcting unit 122.

The virtual slide image is an image having a wide visual field that is generated by stitching a plurality of images having different imaging visual fields, and, in the microscope system 6, a virtual slide image generating function is mounted. Here, in a case where a plurality of images captured by the microscope device 3 are directly stitched, an unnatural boundary is generated in a portion stitching the images due to the influence of shading generated according to the characteristics of the optical system and the like. Thus, in the eighth embodiment, images for which a shading correction has been performed by the image correcting unit 122 are stitched together.

The configurations and the operations of the shading component calculating unit 121 and the image correcting unit 122 are similar to those according to the first embodiment. Alternatively, the shading component calculating unit 121 and the image correcting unit 122 may be operated similar to one of the second to fifth embodiments. In addition, similar to the seventh embodiment, the flat area searching unit 211 may be further provided.

The image acquiring unit 11 and the image processing unit 12 may be configured by dedicated hardware or be configured by reading a predetermined program into hardware such as a CPU. In the latter case, a control program used for causing the image acquiring unit 11 to perform control of an imaging operation of the microscope device 3 to be described later, an image processing program used for causing the image processing unit 12 to perform image processing including a shading correction, various parameters and setting information used in the execution of such programs may be stored in the storage unit 13.

The display device 5 is configured by a display device such as an LCD, an EL display, or a CRT display and displays an image output from the image processing device 4 and related information.

Figure 26:
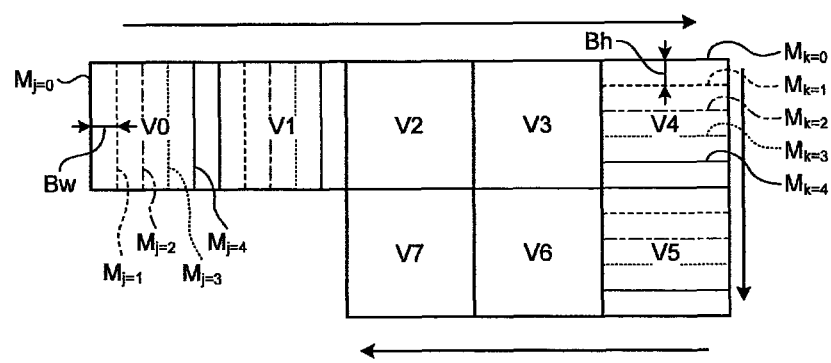
FIG. 26 is a schematic diagram that illustrates an operation of acquiring a plurality of images according to the eighth embodiment of the present invention.

Next, an image acquiring operation of the microscope system 6 will be described. The microscope system 6 can perform the acquisition of images used for generating a virtual slide image and the acquisition of images used for calculating a shading component in a combining manner. FIG. 26 is a schematic diagram that illustrates an operation of acquiring a plurality of images according to the eighth embodiment.

For example, as illustrated in FIG. 26, when images V0 to V7 used for generating a virtual slide image are acquired, only during a section (for example, during a period in which the images V0 and V1 are acquired) of a part of a period in which the imaging visual field is moved in the horizontal direction, imaging is performed with the moving pitch of the imaging visual field narrowed (for example, set to the length Bw), whereby images $M_{j=0}$, $M_{j=1}$, $M_{j=2}$, $M_{j=3}$, and $M_{j=4}$ used for calculating the shading components of the horizontal direction are acquired. Among these, the image $M_{j=0}$ and the image V0 have a common subject within the imaging visual field, and each of the images can be used as both the images. In addition, only during a section (for example, during a period in which the images V4 and V5 are acquired) of a part of a period in which the imaging visual field is moved in the vertical direction, imaging is performed with the moving pitch of the imaging visual field narrowed (for example, set to the length Bh), whereby images $M_{k=0}$, $M_{k=1}$, $M_{k=2}$, $M_{k=3}$, and $M_{k=4}$ used for calculating shading components of the vertical direction are acquired. Among these, the image $M_{k=0}$ and the image V4 have a common subject within the imaging visual field, and each of the images can be used as both the images. While the image capturing of the images V0, V1, . . . is performed, the calculation of shading components from the acquired images $M_{j=0}$ to $M_{j=4}$ may be performed in parallel therewith, or a shading correction may be performed using the calculated shading components in parallel therewith.

In this way, according to the eighth embodiment, the moving direction of the imaging visual field at the time of acquiring images used for generating a virtual slide image and the moving direction of the imaging visual field at the time of acquiring images used for calculating shading components are common, and accordingly, such images can be efficiently acquired without unnecessarily moving the specimen stage 303. In addition, since some of the images used for generating a virtual slide image can be used for generating shading components, the number of times of imaging can be decreased.

In addition, on the acquisition path for images used for generating a virtual slide image, a position at which images used for calculating shading components are acquired may be arbitrary set. Furthermore, it may be configured such that images used for calculating shading components are acquired at a plurality of positions on the acquisition path for images used for generating a virtual slide image, and a calculated shading component may be combined at each position at which the image is acquired. In such a case, by using the combined shading component, the degree of robustness in the shading correction can be improved.

In addition, depending on the positioning precision of the specimen stage 303 and the resolution of the microscope device 3, there are cases where a deviation occurs in the moving amount of the specimen stage 303 set in advance. In such a case, positioning of an image used for generating a virtual slide image may be performed based on the value of the scale disposed on the stage, the number of pulses of the stepping motor 307*a*, or image matching, or a combination thereof. According to the eighth embodiment, the imaging visual field V is only sequentially moved in two directions within the plane of the subject SP, and accordingly, such positioning can be easily performed.

According to some embodiments, first and second image groups each sharing a common part of a subject with at least one of the other images in first and second directions are acquired, and a normalized shading component and a non-normalized shading component are calculated based on luminance of an area including a flat area for each of the first and second image groups, and a shading correction is performed on shading areas in the images by using the normalized shading component and the non-normalized shading component. Accordingly, it is possible to decrease the number of images required for the calculation of shading components, and to perform the shading correction with high precision in a short time by employing a simple configuration.

The present invention is not limited to the first to eighth embodiments described above, but various inventions can be formed by appropriately combining a plurality of elements disclosed in the first to eighth embodiments. For example, several elements may be excluded from all the elements represented in the first to eighth embodiments. Alternatively, elements represented in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   an image acquiring unit configured to acquire first and second image groups including a plurality of images each sharing a common part of a subject with at least one of the other images in each of different first and second directions;
   a shading component calculating unit configured to calculate, as a shading component, a ratio of luminance of an area in one or more images, the area sharing a common subject with another area including a flat area whose shading component is constant in a single image other than the one or more images, to luminance of the another area, for each of the first and second image groups; and
   an image correcting unit configured to perform a shading correction on shading areas in the images by using the shading component, wherein
   the shading component includes a normalized shading component using, as a reference, luminance of the flat area in a common area where the single image and the one of the other images share the common subject, and a non-normalized shading component using, as a reference, luminance of an area other than the flat area in the common area, and
   the image correcting unit is configured to perform the shading correction based on the normalized shading component and the non-normalized shading component.

2. The image processing device according to claim 1, wherein
   the shading component calculating unit comprises:
      a first shading component calculating unit configured to calculate, based on the first image group, the shading component based on luminance of an area that includes the flat area in the single image and is aligned in the second direction with respect to the flat area; and
      a second shading component calculating unit configured to calculate, based on the second image group, the shading component based on luminance of an area that includes the flat area in the single image and is aligned in the first direction with respect to the flat area.

3. The image processing device according to claim 1, wherein
   the image correcting unit comprises:
      a first image correcting unit configured to perform the shading correction on a first area of the shading areas in the images, by using the normalized shading component having been calculated for the first area; and
      a second image correcting unit configured to perform the shading correction on a second area of the shading areas in the images, the normalized shading component having not been calculated for the second area, by using the non-normalized shading component calculated for the second area and using the normalized shading component calculated for an area used as a reference when the non-normalized shading component is calculated for the second area.

4. The image processing device according to claim 3, wherein
   the second image correcting unit is configured to perform the shading correction by using the non-normalized shading component calculated from one of the first and second image groups and using the normalized shading component calculated from the other of the first and second image groups.

5. The image processing device according to claim 1, wherein
   if a shading component for a partial area in the single image is known, the shading component calculating unit is configured to calculate the shading component for the area in the one or more images, by using luminance of the partial area, the luminance of the area in the one or more images that shares the common subject with the partial area, and the known shading component.

6. The image processing device according to claim 5, wherein
   based on a plurality of combinations of the single image and the one or more images, the shading component calculating unit is configured to calculate, for each of the first and second image groups, a plurality of shading components for the shading areas in the images other than the single image, and to calculate an average of the plurality of shading components.

7. The image processing device according to claim 1, wherein
the shading component calculating unit is configured to calculate the shading component, for each of the first and second image groups, based on a plurality of combinations of the single image and the one or more images, the plurality of combinations having different texture components in common areas where the single image and the one or more images share the common subject.

8. The image processing device according to claim 7, wherein
the shading component calculating unit is configured to accumulate values of luminance of corresponding areas between the plurality of images for each of the first and second image groups, and to calculate the shading component by using the accumulated values.

9. The image processing device according to claim 7, wherein
the shading component calculating unit is configured to calculate a plurality of shading components based on the plurality of combinations, and to calculate an average of the plurality of shading components.

10. The image processing device according to claim 1, wherein
the shading component calculating unit is configured to calculate the shading component of the shading areas in the images by using two non-normalized shading components calculated for the shading areas in the images based on the first and second image groups and using two normalized shading components calculated for two areas used as a reference when the two non-normalized shading components are calculated.

11. The image processing device according to claim 1, further comprising a flat area searching unit configured to search for the flat area based on a gradient of luminance of pixels included in an area where the single image and the one or more images share the common subject.

12. The image processing device according to claim 1, wherein
the first and second directions are orthogonal to each other.

13. An imaging device comprising:
the image processing device according to claim 1;
an optical system configured to generate an image of the subject;
a moving unit configured to move at least one of the subject and the optical system, thereby to move a visual field of the optical system with respect to the subject; and
an imaging unit configured to image the subject, wherein
the image acquiring unit is configured to control the imaging unit to perform imaging while causing the moving unit to move the visual field in the first and second directions, thereby to acquire the first and second image groups.

14. A microscope system comprising:
the imaging device according to claim 13; and
a stage on which the subject is configured to be placed, wherein
the moving unit is configured to move at least one of the stage and the optical system.

15. The microscope system according to claim 14, wherein
the image processing device further comprises a virtual slide generating unit configured to stitch images whose visual fields are adjacent to one another, included in the first and second image groups, thereby to generate a virtual slide image.

16. An image processing method comprising:
acquiring first and second image groups including a plurality of images each sharing a common part of a subject with at least one of the other images in each of different first and second directions;
calculating, as a shading component, a ratio of luminance of an area in one or more images, the area sharing a common subject with another area including a flat area whose shading component is constant in a single image other than the one or more images, to luminance of the another area, for each of the first and second image groups; and
performing a shading correction on shading areas in the images by using the shading component, wherein
the shading component includes a normalized shading component using, as a reference, luminance of the flat area in a common area where the single image and the one of the other images share the common subject, and a non-normalized shading component using, as a reference, luminance of an area other than the flat area in the common area, and
the shading correction is performed based on the normalized shading component and the non-normalized shading component.

17. A non-transitory computer-readable recording medium with an executable image processing program stored thereon, the program causing a computer to execute:
acquiring first and second image groups including a plurality of images each sharing a common part of a subject with at least one of the other images in each of different first and second directions;
calculating, as a shading component, a ratio of luminance of an area in one or more images, the area sharing a common subject with another area including a flat area whose shading component is constant in a single image other than the one or more images, to luminance of the another area, for each of the first and second image groups; and
performing a shading correction on shading areas in the images by using the shading component, wherein
the shading component includes a normalized shading component using, as a reference, luminance of the flat area in a common area where the single image and the one of the other images share the common subject, and a non-normalized shading component using, as a reference, luminance of an area other than the flat area in the common area, and
the shading correction is performed based on the normalized shading component and the non-normalized shading component.

* * * * *